US005619698A

United States Patent [19]
Lillich et al.

[11] Patent Number: 5,619,698
[45] Date of Patent: Apr. 8, 1997

[54] METHOD AND APPARATUS FOR PATCHING OPERATING SYSTEMS

[75] Inventors: Alan W. Lillich, Los Gatos; Jeffrey R. Cobb, Sunnyvale; Erik L. Eidt, Campbell; Wayne N. Meretsky, Los Alto, all of Calif.

[73] Assignee: Apple Computer, Inc., Cupertino, Calif.

[21] Appl. No.: 435,360

[22] Filed: May 5, 1995

[51] Int. Cl.$^6$ .................................................. G06F 9/44
[52] U.S. Cl. ............................................................ 395/710
[58] Field of Search ..................................... 395/650, 700

[56] References Cited

U.S. PATENT DOCUMENTS

| | | | |
|---|---|---|---|
| 5,325,532 | 6/1994 | Crosswy et al. | 395/700 |
| 5,335,344 | 8/1994 | Hastings | 395/575 |
| 5,359,730 | 10/1994 | Marron | 395/650 |
| 5,369,770 | 11/1994 | Thomason et al. | 395/725 |
| 5,375,241 | 12/1994 | Walsh | 395/700 |
| 5,446,898 | 8/1995 | Bealkowski | 395/700 |
| 5,481,713 | 1/1996 | Wetmore et al. | 395/700 |

OTHER PUBLICATIONS

"Inside Macintosh: PowerPC System Software," Apple Computer, Inc., 1994, Addison–Wesley Publishing Company.

Primary Examiner—Kevin A. Kriess
Assistant Examiner—John Q. Chavis
Attorney, Agent, or Firm—Hickman Beyer & Weaver

[57] ABSTRACT

The present invention discloses a variety of methods and apparatus for providing patches within a computer operating system. A patch structure in accordance with one embodiment of the present invention includes a patch block which serves to link the patch structure into a patch chain, and a patch which contains the desired functionality of the patch structure. The patch chain includes a root patch structure and a final patch structure. The root patch structure has a root patch block and a given function which has the root functionality. One aspect of the present invention teaches a method for integrating patches into a computer operating system including the steps of obtaining a new patch to be associated with a patch chain for the given function, determining whether a patch chain is already created in the operating system for the given function and creating a root patch block pointing to the given function as the start of a new patch chain if a patch chain has not already been created for the given function, creating a new patch block for the new patch, and inserting data into the new patch block to cause the new patch block to point to the new patch.

75 Claims, 11 Drawing Sheets

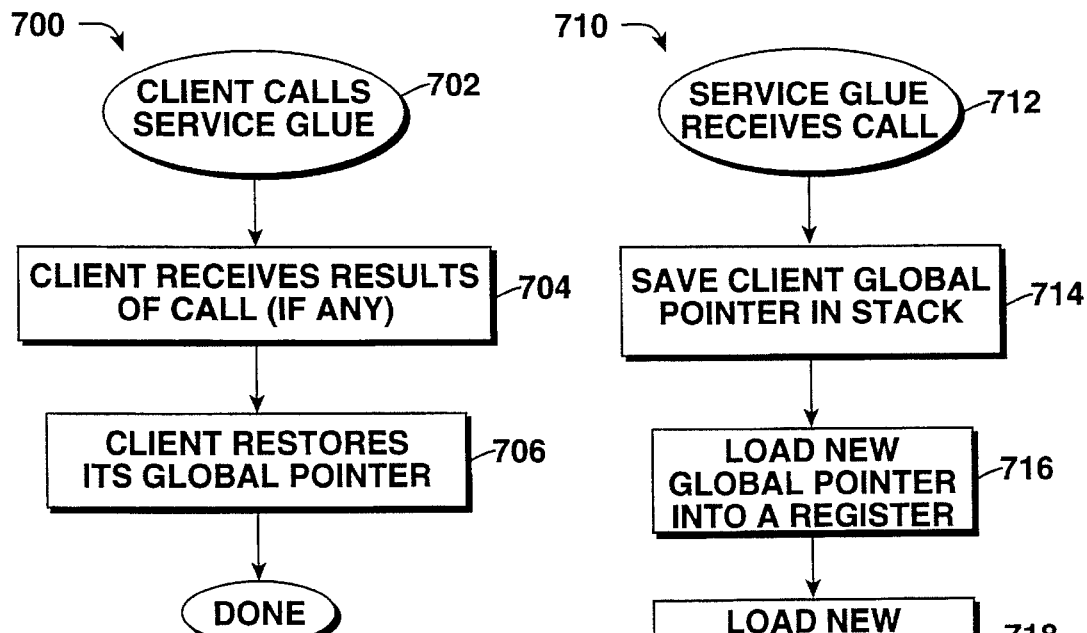
Fig. 9
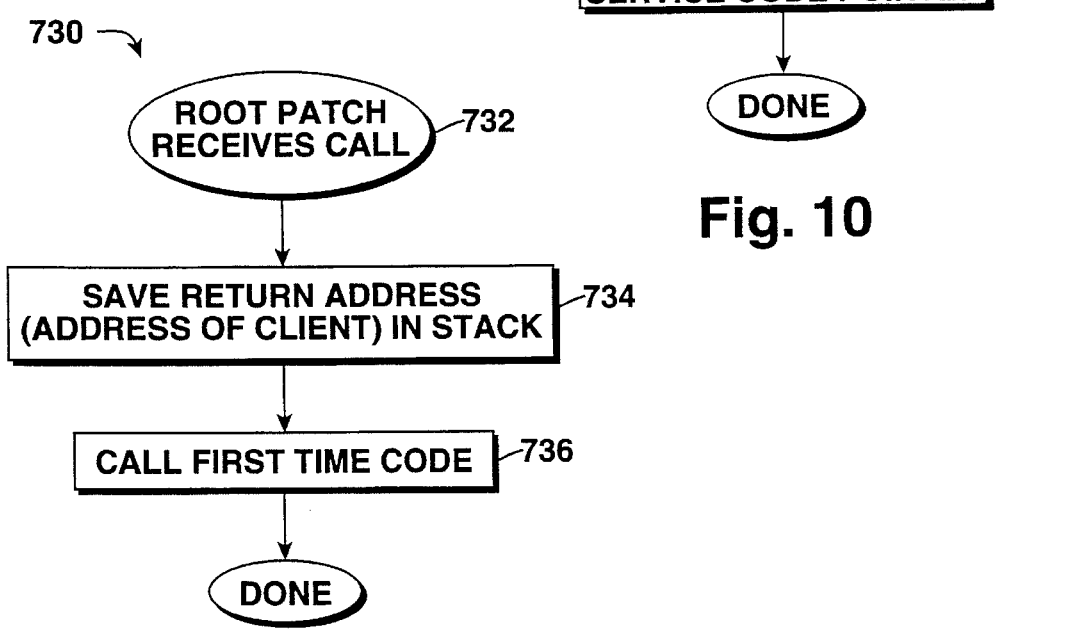
Fig. 10
Fig. 11

METHOD AND APPARATUS FOR PATCHING OPERATING SYSTEMS

TECHNICAL FIELD

This invention relates generally to computer operating systems, and more particularly to methods and apparatus for providing computer operating system patches.

BACKGROUND

Computer operating systems often allow application programs to install "patches" within the operating system code. As used herein, a "patch" is computer code which replaces or augments a function already implemented on the computer. Typically multiple patches may be installed thereby further enhancing the original function.

When a patch replaces a function, any client calls made to the given function are transparently (from the client's perspective) redirected to the patch. The patch, in turn, performs the requested service and, if necessary, returns any results of the call to the client. In a similar manner, when a patch augments a given function, any client calls made to the given function are redirected to the patch. The patch then performs any preprocessing and passes the call along to the given function. The given function will return results directly to the client, or return results to the patch. If desired, the patch may perform post-processing and, if necessary, return the results of the call to the client.

The prototypical patch function must have the same parameters as the given function which it patches and may perform both pre-processing and post-processing. In order to further elaborate, two versions of pseudo-code for a prototypical patch function will now be provided. As will be appreciated by those skilled in the art of computer programming, the following pseudo-code provides a rough outline for use in programming a typical patch function.

The first pseudo-code is suitable for use on a computer system implementing register calling conventions:

```
typedef ResultType(TheProcType) (Param1Type param1,...);
ResultType MyPatch (Param1Type param1,...1)
{
    Param1Type innerParam1;
    ...
    ResultType innerResult, finalResult;
    DoPrefixStuff; //This is the "head patch" part//
    innerResult = (*(TheProcType)NextPatch) (innerParam1,...);
    DoPostfixStuff, //This is the "tail patch" part//;
    return finalResult;
}
```

The second pseudo-code is suitable for use on a computer system implementing stack calling conventions:

```
typedef ResultType(TheProcType) (int state, Param1Type param1,...);
ResultType MyPatch (int state, Param1Type param1,...)
{
    Param1Type innerParam1;
    ...
    ResultType innerResult, finalResult;
    DoPrefixStuff; //This is the "head patch" part//
    innerResult = (*(TheProcType)NextPatch) (state, innerParam1,...);
    DoPostfixStuff; //This is the "tail patch" part//;
    return finalResult;
}
```

With reference to FIG. 2, the well known 68K patching paradigm 100 will be described. By way of background, the 68K patching paradigm 100 is implemented by versions of the Macintosh® Operating system designed for the Motorola 68K series of microprocessors, which operating system is hereinafter referred to as the "68K operating system." The paradigm 100 is implemented on a computer system such as computer system 50 of FIG. 1, wherein a CPU 52 includes one of the Motorola 68K series microprocessors or microcontrollers as well as other components necessary to properly interface with and control other devices coupled with the CPU 52.

The system routines for the 68K operating system reside mainly in ROM. However, to provide flexibility for any subsequent development, application code written for execution within the 68K operating system must be kept free of any specific ROM addresses. For this reason, all calls to system routines are passed indirectly through a trap table resident in RAM. This indirect mechanism permits the ROM addressing of system routines to vary, or to be replaced by patch routines, without affecting the operation of applications which utilize the system routines.

The 68K patching paradigm 100 includes application code 102 having at least one ATRAP instruction 104, low memory locations 106, a trap dispatcher 108, a trap table 110, ROM 120 having system code 122, and RAM 130 including at least one patch code 132. While the operating system routines reside mainly in ROM 120 (in the original state), information regarding the locations of the operating system routines is encoded in compressed form within ROM 120. Upon system start up, this information is decompressed and the trap table 110 is formed in RAM 130.

The indirect calling mechanism of the 68K patching paradigm 100 is further implemented by utilizing a feature of the 68K series microprocessor called a trap. A "trap" is a kind of microprocessor exception which arises in response to the execution of certain machine language instructions. An "exception" is an error or abnormal condition detected by the processor during the course of execution. For example, any 68K machine language instruction whose first four bits has the hexadecimal value "A" will generate an exception (hence the name "ATRAP"). In the 68K operating system, the set of language instructions whose first four bits has the hexadecimal value "A" are specifically set aside by the operating system for use in implementing client calls to system routines.

During execution of application code 102, the 68K microprocessor will encounter and execute the ATRAP 104. In response, the microprocessor pushes some state onto the computer system's stack, the state including the address of the ATRAP instruction 104. Then, the microprocessor resumes execution at the address indicated in a low memory location, which is the address of the trap dispatcher 108.

Once executing, the trap dispatcher 108 examines the bit pattern of the ATRAP instruction 104 to determine what operation it stands for, looks up the address of the corresponding system routine in the trap table 110, and then jumps to the corresponding system routine.

One example of the general execution path of a system routine which is not patched is symbolized by flow control lines 140, 142, 144, 146, and 148. Note that in certain cases the flow control lines may imply structure. For example, the flow control line 146 has its tail at address_1 in trap table 110 and its head at the beginning of the system routine within the system code 120: right to where address_1 points. However, the flow control lines in general are not intended to illustrate structure.

Flow control line 140 symbolizes the microprocessor pushing the address of the ATRAP instruction 104 onto the computer system's stack and beginning execution at the trap dispatcher 108. Flow control line 142 symbolizes the trap dispatcher 108 evaluating the ATRAP instruction 104 and flow control line 144 symbolizes the trap dispatcher looking up the corresponding system routine in the trap table 110. Flow control line 146 symbolizes jumping to a system routine 123 to which address_1 points and flow control line 148 symbolizes jumping back to the application code 102 once the system routine 123 has been executed.

Because the trap table 110 is resident in RAM 130, individual entries in the trap table 110 can be changed to point to addresses other than the original ROM addresses. This allows the system routines to be replaced or augmented by patches. At startup time the system can load new versions of individual routines (e.g. from the System file or from a floppy disk) into RAM and then patch the trap table in order to redirect any calls to the original system routine to the new versions. Additionally, when new applications are launched they too can load new versions of individual routines into RAM and then patch the trap table in order to redirect any calls to the original system routine to the new versions.

One example of a redirection to a patched system routine is symbolized in FIG. 2 by dashed flow control lines 150 and 152. Similar to the unpatched system routine described previously, an ATRAP instruction 104 calling a patched system routine will initiate a process in which the trap dispatcher 108 will look up the system routine corresponding to the ATRAP instruction 104. However, in the patched case, address_1 will point to patch code 132 located in RAM 130 rather than the original system routine. Thus dashed flow control line 150 illustrates jumping to the patch code 132 and dashed flow control line 152 illustrates jumping back to the application code 102 after the patch code 132 has finished executing.

Next, in reference to FIG. 3, one method for installing patches in the 68K operating system will be described. In an initial step 200, the computer boot process is started. Then, in a step 202, the ROM boot is performed. In ROM boot step 202, initialization procedures such as expanding the trap table from ROM into RAM are performed. Next, in a step 204, the disk operating system boot is performed. At this point any system patches are also installed.

As discussed previously, new versions of individual system routines may be loaded into RAM and the trap table patched in order to redirect any calls to the original system routine to the new versions. After this is complete, the operating system boot procedure is complete in a step 206. In a next step 208, the application "Finder" is launched. As will be appreciated by those skilled in the art, the Finder is the primal application which performs critical tasks such as displaying the Macintosh® desktop and launching other applications at the request of the user. Once the Finder is running, in a step 210 other applications may be launched and in turn any patches necessary for the other applications may be installed.

Turning now to FIG. 4, the well known PowerPC patching paradigm 300 will be described. By way of background, the PowerPC patching paradigm 300 is implemented by versions of the Macintosh® Operating system designed for the PowerPC series of microprocessors, which operating system is hereinafter referred to as the "PowerPC operating system." The paradigm 300 is implemented on a computer system such as computer system 50 of FIG. 1, wherein the CPU 52 includes one of the PowerPC series microprocessors as well as other components necessary to properly interface with and control the other devices.

The example PowerPC patching paradigm 300 includes a native PowerPC application 302, an emulated segment 304, an interface library 306, a native PowerPC system routine 308, and a routine descriptor 310. In the PowerPC native environment, a "fragment" is a block of executable PowerPC code and its associated data. As illustrated, the native PowerPC application 302 is a fragment having application code 320 and application data 322.

In the native PowerPC environment, rather than directly calling system routines, application code will have a call 324 to service glue 326. As will be appreciated by those skilled in the art, service glue 326 provides an indirection across dynamically linked library boundaries. The main function of the service glue is to save memory resources. That is, if the system routine were called more than once, the service glue 326 plus the multiple calls require less memory than duplicating service glue 326 in multiple locations. The service glue in turn uses a pointer 328 found in the application data 322 which points to the transition vector 330 of the interface library 306.

In explanation, a transition vector such as transition vector 330 is a data structure which has two pointers: a code pointer (which is the address of the code of the fragment being called) and a global pointer (which is the address of the called fragment's table of contents). A fragment's "table of contents" is a table containing a pointer to each routine or data item that is imported from some other fragment, as well as pointers to the fragment's own static data.

The interface library 306 is a fragment including interface library code 332 and interface library data 334. The interface library 306 serves a function similar to the trap dispatcher 108 of FIG. 2, as is described in the following. When the service glue 326 is called to execute a system routine, the interface library code 332 is invoked via the interface transition vector 330. Then the interface library 306 evaluates the call using a trap table 340 to determine the appropriate system routine to jump to. The trap table 340 is used in a manner similar to the trap table 110 of FIG. 2.

The appropriate system routine as determined by the interface library 306 may be written in 68K type code such as 68K code 344 or may be in native PowerPC code (i.e. dynamically linked library type code). In the case of 68K code, execution jumps directly from the trap table 340 to the 68K code 344. In the case of native PowerPC code, execution jumps first to a routine descriptor 310. As used herein, a "routine descriptor" is a data structure which contains mode information necessary for the operating system to properly execute the code. By way of explanation, the PowerPC operating system has an emulator which allows 68K code to be properly executed. In the case of 68K code, execution proceeds via the trap table 340, a mixed-mode manager, and an emulator to interpret and execute the 68K code 344. The routine descriptor is one component of this mechanism.

Patching in the PowerPC patching paradigm 300 is performed in a manner similar to the 68K patching paradigm 100 of FIG. 2. That is, a patch is added by changing an element in the trap table 340 to redirect any system calls to patch code residing in RAM. Thus the PowerPC patching paradigm 300 functions by emulating the appropriate elements of the 68K patching paradigm 100 of FIG. 2.

While the prior art patching systems provide the basic capability of patching system routines, these paradigms are neither resource efficient nor do they provide the flexibility and functionality required by modern computer systems. Each of the prior art patching paradigms result in costly (in terms of system resource utilization) system exceptions every time a system routine is called. For example, each ATRAP instruction executed generates a costly exception.

A further limitation of prior art patching paradigms is that only distinguished system routines (i.e. system routines called indirectly through the trap table) may be patched. Another limitation of prior art patching paradigms is that chaining of patches (i.e. multiple patches for a system routine) must be done manually. That is, each new patch must "capture" the preceding routine and manually chain through. Furthermore, the prior schemes do not allow patches to be inserted in or deleted from a patch chain, rather they can only be appended.

DISCLOSURE OF THE INVENTION

According to the present invention, a variety of methods and apparatus for providing computer patches are disclosed. A first aspect of the present invention teaches a computer implemented method for integrating patches into a computer operating system. The operating system of this method is capable of supporting a plurality of patch structures in a patch chain, each patch structure including a patch and a patch block, the patch block pointing to the patch, the patch chain including a root patch block pointing to a given function supported by the operating system, wherein each patch structure of the patch chain can process a call for the given function, each of the plurality of patch blocks pointing to either another patch block or to the root patch block. The method further includes the steps of obtaining a new patch to be associated with a patch chain for the given function, determining whether a patch chain is already created in the operating system for the given function, and creating a root patch block pointing to the given function as the start of a new patch chain if a patch chain has not already been created for the given function, creating a new patch block for the new patch, and inserting data into the new patch block to cause the new patch block to point to the new patch. Thus the method forms a new patch structure joined with the patch chain for the given function.

A separate method aspect of the present invention discloses another computer implemented method for integrating patches into a computer operating system. An operating system capable of supporting a plurality of patch structures in a patch chain is provided. Each patch structure includes a patch and a patch block, the patch block pointing to the patch, the patch chain including a root patch block pointing to a root function supported by the operating system, wherein each patch structure of the patch chain can process a call for the root function, each of the plurality of patch blocks pointing to either another patch block or to the root patch block. The method further includes the steps of obtaining a new patch intended to modify the functionality of a given function, the given function operative to be either a root function or a patch, determining whether a patch chain including the given function is already created in the operating system, and creating a root patch block pointing to the given function as the start of a new patch chain if a patch chain including the given function has not already been created, creating a new patch block for the new patch, and inserting data into the new patch block to cause the new patch block to point to the new patch, thereby forming a new patch structure, and to cause the new patch structure to be joined with the patch chain for the given function.

One embodiment of the present invention is an operating system for a computer comprising means receptive to one or more patches for a given function that is capable of running on; the computer, means for creating a patch chain comprising a root patch block pointing to the given function and at least one patch structure chained with the root patch block, the patch structure including a patch block pointing to an associated patch, wherein the patch structure is capable of processing a call for the given function, and means for adding new patch structures to the patch chain. In this embodiment, a call to the given function may be processed by each of the patches in the patch chain and by the given function.

In another aspect of the present invention, a method for handling a function call having at least one patch comprises the steps of diverting a call from a client for a specified function to a root patch block, wherein the root patch block and the specified function define a root patch structure, saving a return address of the client finding a first patch structure in a patch chain that includes the root patch structure, and then diverting the call to the first patch structure capable of processing the call. In this method, the first patch structure selectively returns process control to the client at the return address or calls the subsequent patch in a nested manner. Further, if the first patch structure calls the subsequent patch, when the subsequent patch returns the call, the first patch structure may do post-processing and then return to its caller.

In a related method aspect, the step of finding a first patch in a patch chain includes the substeps of (a) selecting a patch structure, the patch structure being one link in the chain and (b) determining if an enable flag corresponding to the selected patch structure indicates that the selected patch structure is enabled This method further includes (c) repeatedly performing steps (a) and (b) until the enable flag corresponding to the selected patch structure indicates that the selected patch structure is enabled. In order to perform the looping cycle of step (c), the selection process of step (a) operates a first time by selecting a final patch structure located at an end of the patch chain opposite to the root patch structure and then upon subsequent repetitions of step (a) a subsequent patch structure one link closer to the root patch structure than an adjacent, previous patch structure is selected.

In another related method aspect, when the first patch structure passes the system call on to an additional patch structure in the patch chain, the step of passing the system call to an additional patch structure includes the substeps of (a) saving a return address of the first patch structure, (b) selecting a subsequent patch structure, and (c) determining if an enable flag corresponding to the selected subsequent patch structure indicates that the selected patch structure is enabled. This method further includes the step of (d) repeatedly performing steps (b) and (c) until the enable flag corresponding to the selected subsequent patch structure indicates that the selected patch structure is enabled. To perform the looping cycle of step (d), the selection process of step (b) operates by selecting a subsequent patch structure one link closer to the root patch structure than an adjacent, previous patch structure.

According to another embodiment of the present invention, a patch chain for a computer operating system comprises a root patch structure including a root patch block and an associated given function, the root patch block pointing to the associated given function, the associated given function having a root functionality and a final patch structure being located on an end of the patch chain which is opposite the root patch structure, the final patch structure including a final patch block pointing to a final patch, the final patch having a final patch functionality intended to modify the root functionality. When the root patch structure and the final patch structure are the only patch structures in the patch chain, then the final patch structure is chained to the root patch structure. In this embodiment, a call from a client to the given function is diverted to a first time patch code of the operating system by the root patch block.

Yet another embodiment of the present invention teaches a computer system having a central processing unit, memory coupled to the central processing unit, and a first time patch code at least partially stored in the memory and implemented on the central processing unit. The first time patch code is responsive to calls from a patch chain having a plurality of patch structures to selectively redirect the call to a desired one of the plurality of patch structures. The computer system further includes a patching system having data structures at least partially stored in the memory.

The data structures each include a root patch structure having a root patch block and an associated function component, the root patch block pointing to the associated function component, the root patch structure being formed at one end of a first patch chain. Each data structure further includes a final patch structure forming an opposite end of the first patch chain relative to the root patch structure and when the root patch structure and the final patch structure are the only patch structures in the first patch chain then the final patch structure is chained to the root patch structure, the final patch structure including a patch block pointing to a patch, wherein a call from a client process to the function component is diverted to the first time code by the root patch block.

In related embodiments the first time patch code is for use by a plurality of patch chains. However, in other related embodiments, the first time patch code is for use only by the first patch chain.

BRIEF DESCRIPTION OF THE DRAWINGS

FIG. 7 is a diagrammatic illustration of a modem patching paradigm in accordance with one embodiment of the present invention;

FIG. 9 is a flow chart illustrating a method for a client to invoke a system routine in accordance with one aspect of the present invention, the service routine invoked indirectly as the client's call is directed to its service glue;

FIG. 10 is a flow chart illustrating a method for a client's service glue to pass a call for a system routine to the new code location;

FIG. 11 is a flow chart illustrating a method for a root patch block to receive a call and respond by calling a first time code, the method in accordance with one aspect of the present invention;

BEST MODES FOR CARRYING OUT THE INVENTION

Figure 1:
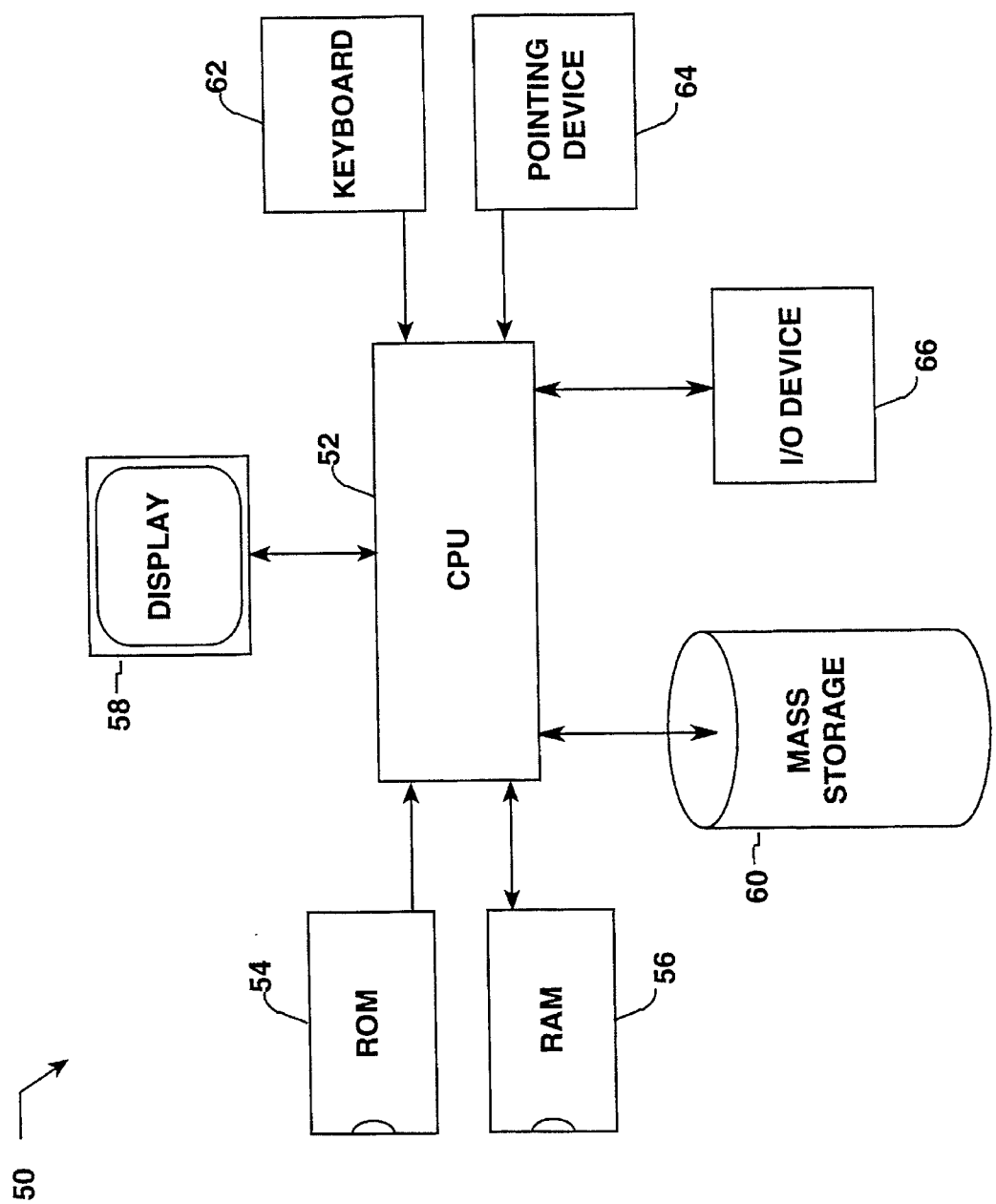
FIG. 1 is a block diagram of a computer system.

There are a number of computer operating systems available for desktop computers, workstations, etc. Many popular operating systems (such as UNIX and Macintosh® operating systems) utilize dynamically linked library (DLL) architecture. With a DLL architecture, a "root fragment" (the term "fragment" being used interchangeably with the term DLL) is dynamically linked with other import library fragments to achieve an executable process having a desired functionality. The teachings of the present invention are suitable for any operating system which utilizes the DLL architecture and, as will be apparent, may be extended to other operating system architectures.

In the computing environment of the present invention, the basic unit of executable code and its associated data is termed a "fragment" or a "dynamically linked library." Before any fragment can be executed on a computer system, it must be loaded into the computer system's memory and prepared for execution. Fragment preparation consists mainly of resolving at runtime any import symbols in the fragment that reference code or data exported by other fragments.

Thus the computing environment of the present invention provides access to external resources through an indirect calling mechanism. In the described embodiments, dynamically linked libraries (DLLs) have a pointer (an indirection) to the patched function's TVector. The TVector has a code pointer pointing to the function code. Thus by changing the patched function's TVector to point to a patch chain of the present invention, all clients of the patched function gain the desired function of the patch. By contrast, in computing environments which do not have indirect calling mechanisms each client would have a code pointer pointing to the function code. Therefore, to install a patch, each client's code pointer would have to be modified.

The resolution of import symbols is accomplished through a process called "binding" wherein the address of the code or data corresponding to the import symbol is found and stored in the fragment by a "binding manager", which is a service typically provided by the operating system. As will be appreciated, the binding manager can be implemented in a variety of ways. A few suitable embodiments include implementing the binding manager as a distinct component of the operating system, a multiplicity of operating system functions, a service provided by an application separate from the operating system, or an appropriate combination thereof.

The resolved symbols are often stored in a "table of contents" format having a pointer to each routine or data item that is imported from some other fragment, as well as pointers to the fragment's own static data. These pointers are then used to properly execute the fragment. Once prepared, the initial fragment (termed the "process root") plus all subsequently bound dynamically linked libraries make up an executable process. For a more detailed description of binding managers (especially Apple Computer, Inc.'s binding manager implementation entitled Code Fragment Manager) and dynamically linked library computing environments, please see "Inside Macintosh®: PowerPC System Software", © 1994 Apple Computer Inc., published by Addison-Wesley Publishing Company, which is incorporated herein by reference in its entirety.

In the described embodiments of the present invention, dynamically linked libraries (DLLs), patch code, data closures and executable processes are resident on a computer system which may take any suitable form. By way of example, a representative computer system 50 is illustrated schematically in FIG. 1. The typical computer system 50 includes a central processing unit (CPU) 52 coupled to read only memory (ROM) 54 and with random access memory (RAM) 56. The computer system 50 may optionally include elements such as a display 58, a mass storage device 60, a keyboard 62, a pointing device 64, and an input/output device 66.

As will be appreciated by those skilled in the art, CPU 52 includes a microprocessor and any additional circuitry and/ or device drivers necessary to control the computer system. For instance, the CPU 52 may include a keyboard controller which provides an interface between the microprocessor and the keyboard 62. ROM 64 is typically persistent memory accessible by the CPU 52 which contains the operating system instructions either in an executable format or in a compressed format which is expanded when the computer system 50 boots. RAM 56 is typically transient memory and is used as "scratch pad" memory by the operating system and/or any applications implemented on the computer system 50. For example, if a portion of the operating system present in ROM 64 is in compressed format, it may be expanded and stored into RAM 56.

Devices such as display 58, keyboard 62 and pointing device 64 work together to provide a user interface for the computer system 50. Of course, these three devices are optional as the computer system 50 may perform meaningful work without any of display 58, keyboard 62, and pointing device 64.

Mass storage device 60 is coupled with CPU 52 and may be any mass storage device such as a hard disk system, a floptical disk system, a tape drive or the like. Mass storage device 60 generally includes code fragments such as applications, import libraries, and extensions which are not currently in use by the system. I/O device 66 is coupled to the CPU 52 and may be a network card, a printer port, modem, etc. Additionally there may be a multiplicity of I/O devices such as I/O device 66 coupled to the computer system 50. Design and construction of computer systems such as computer system 50 will be well known to those skilled in the art.

Figure 5:
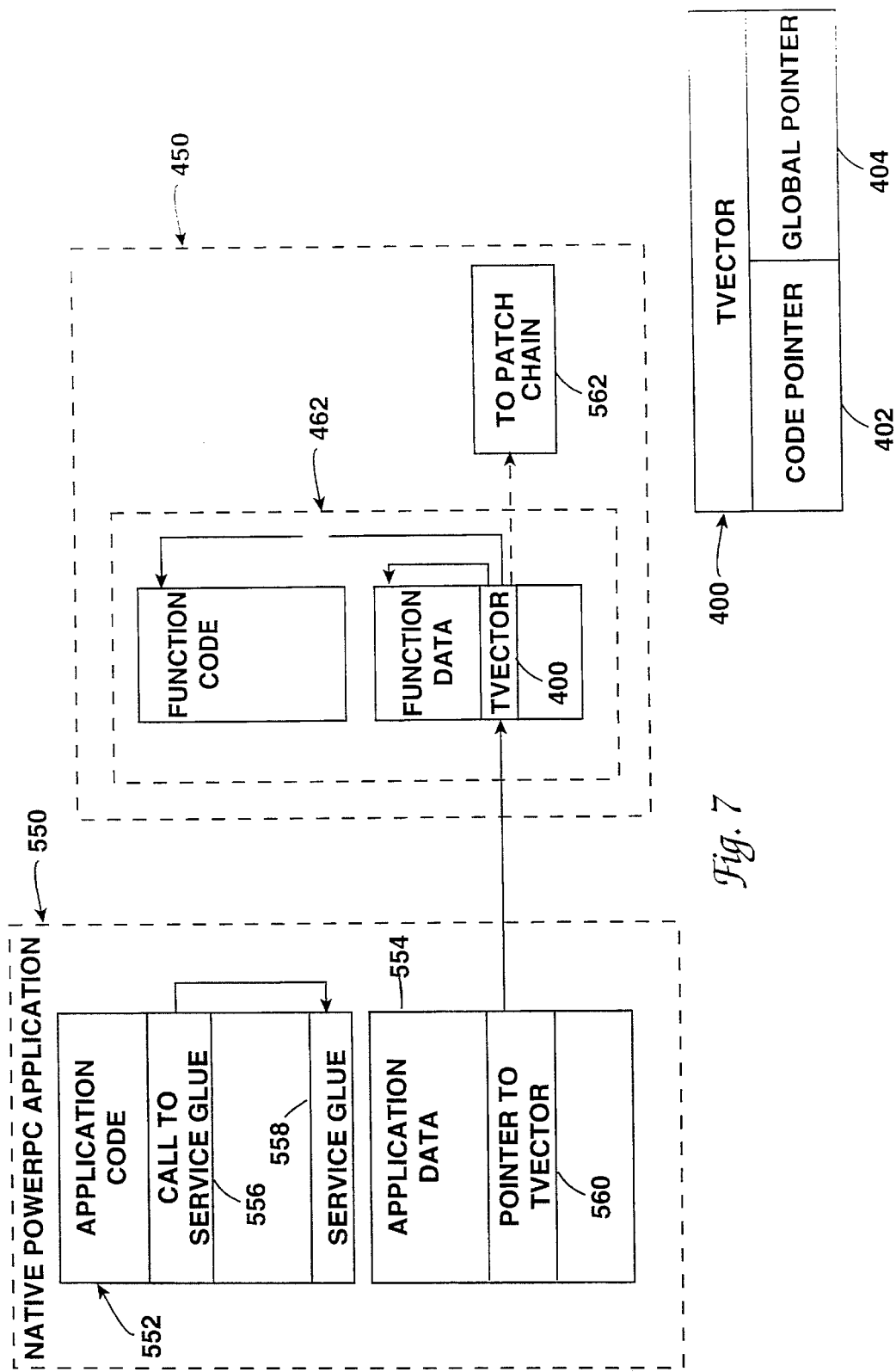
FIG. 5 is a data structure diagram of a transition vector in accordance with one embodiment of the present invention.

Turning next to FIG. 5, a transition vector (TVector) 400 will be described. By way of background, a fragment typically has a transition vector for every given function found within the fragment's code portion. Normally a fragment maintains its TVectors within its data portion. The transition vector 400 is a data structure which includes two pointers: a code pointer 402 and a global pointer 404. The code pointer 402 is the address of the particular given function being called and the global pointer 404 is the address of the called fragment's table of contents. Typically each global pointer 404 found in a fragment has the same value.

Figure 6:
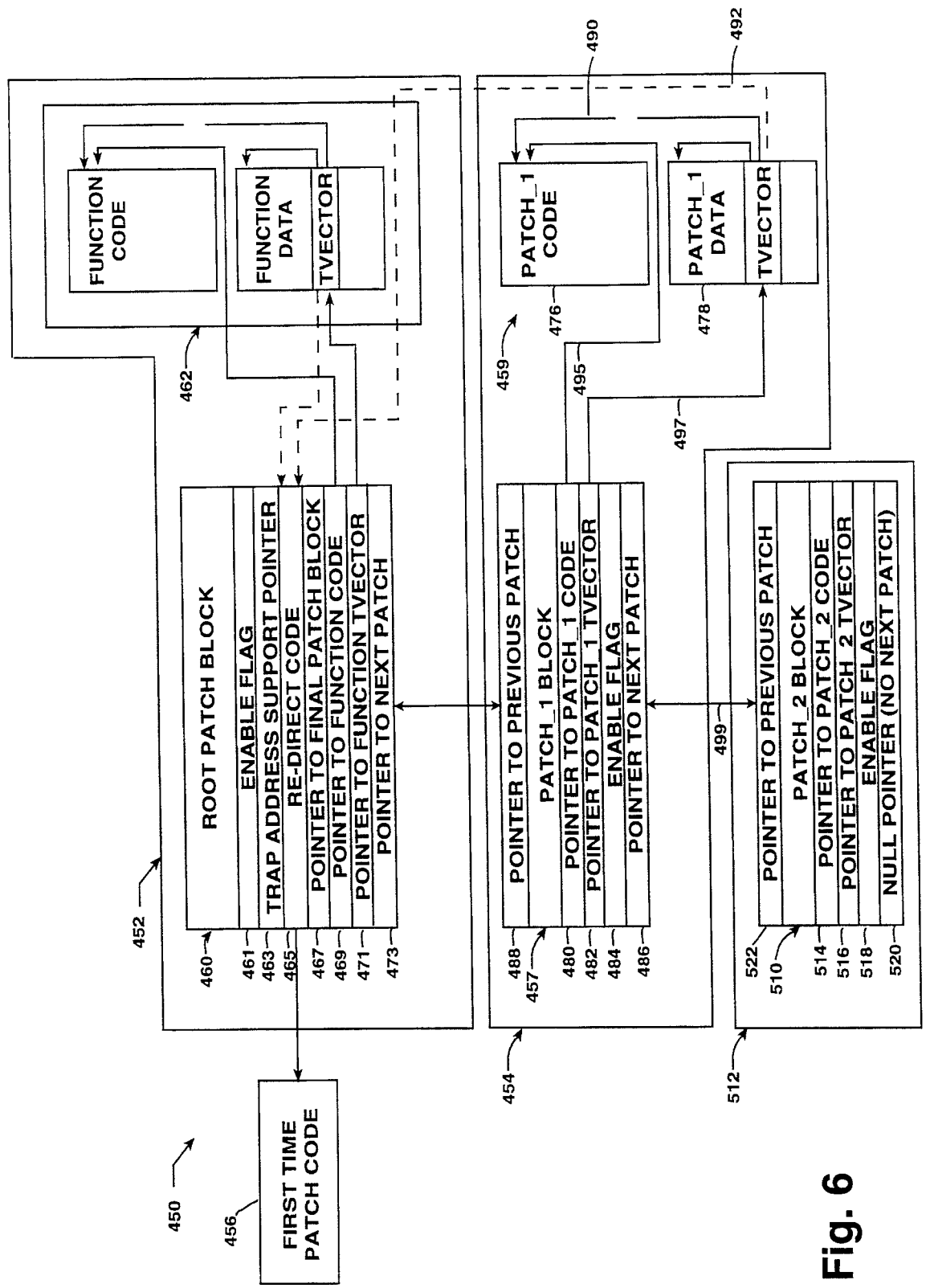
FIG. 6 is a diagrammatic illustration of a patch chain in accordance with one embodiment of the present invention, the patch chain including a root patch structure having a root patch block and a given function, first time code associated with the root patch block, and a couple of extension patch structures.

With reference to FIG. 6, a patch chain 450 in accordance with one embodiment of the present invention will now be described. The patch chain 450 includes a root patch structure 452, an extension patch_1 structure 454, and an associated first time patch code 456. It will be appreciated that there is no limit to the number of patches which can be added into patch chains in accordance with preferred embodiments of the present invention. Additionally, patches may be inserted and/or deleted at any link in the patch chain, thus the name "patch_1 structure" does not imply any necessary ordering, but rather is a location marker only with respect to the specific instance shown in FIG. 6. For example, another patch may be added into the patch chain 450 in-between the root patch structure 452 and the patch_1 structure 454. Furthermore, in preferred embodiments, the associated first time patch code 456 is maintained independent of the patch chain 450 and may be executed by other patch chains.

As a general explanation, a patch structure includes a patch block which serves to link the patch structure into the chain, and a patch which contains the desired functionality of the patch structure. The extension patch_1 structure 454 of FIG. 6 serves as a suitable example for the construction of a patch structure in accordance with one embodiment of the present invention. Fundamental components of patch_1 structure 454 include a patch_1 block 457 and a patch_1 459. The patch_1 459 implements the additional or replacement functionality which the patch_1 structure 454 provides to a given function 462 to which patch chain 450 corresponds. The patch_1 459 includes patch_1 code 476 and patch_1 data 478; patch_1 data 478 having a TVector 400 including a code pointer 402 and a global pointer 404.

In creating the extension patch_1 structure 454, the patch_1 TVector 400 is modified so that patch_1 code pointer 402 points to a re-direct code 465 found in the root patch block 460. The modification of the original patch_1 code pointer 402 is symbolized by the single break in line 490 which points from the patch_1 TVector 400 to the patch_1 code 476. The modified patch_1 code pointer 402 is symbolized by a dashed line 492 which points from the patch_1 TVector 400 to the re-direct code 465.

Patch_1 block 457 maintains the data required to properly execute patch_1 459 and further to properly link the patch_1 454 structure into patch chain 450. Patch_1 block 457 includes a patch_1 code pointer 480, a patch_1 TVector pointer 482, a patch_1 enable flag 484, a next patch pointer 486, and a previous patch pointer 488. As symbolized by solid line 495, the patch_1 code pointer 480 points to the patch_1 code 459. As symbolized by solid line 497, the patch_1 TVector pointer 482 points to the patch_1 TVector 400. Thus, any call made via the TVector 400 to patch_1 459 will be redirected by the modified patch code pointer 402 to the re-direct code 465 of the root patch block 460.

The enable flag 484 of extension patch block 457 is used during execution of the patch chain 450 to determine whether the function of patch_1 459 should be executed. One suitable use for the enable flag 484 involves setting the enable flag 484 to "FALSE" during creation of the extension patch structure 454 and then setting the enable flag 484 to "TRUE" after the creation succeeds. The next patch pointer 486 will point to a subsequent patch block such as patch_2 block 510 of patch_2 structure 512. The previous patch pointer will point to a previous patch block which in the case of FIG. 6 is root patch block 460.

Similar to the patch_1 block 457, the patch_2 block 510 includes a patch_2 code pointer 514, a patch_2 TVector pointer 516, an enable flag 518, a next patch pointer 520 and a previous patch pointer 522. Although not shown in FIG. 6, the patch_2 structure 512 also includes patch_2 data and patch_2 code. As is true in each extension patch block, the patch_2 TVector will be modified to point to the re-direct code 465. However, in contrast to patch_1's next patch pointer 486, patch_2's next patch pointer 520 contains a null value. This is because patch__2 structure 512 is the last patch structure in patch chain 450.

While each extension patch structure will have a data structure as described above in reference to patch_1 structure 454 and patch_2 structure 512, the root patch structure 452 includes additional structure which will now be described.

Similar to an extension patch, the root patch structure 452 includes a root patch block 460 as well as the given function 462. Thus the given function 462 plays a role within the root patch structure 452 which is analogous to the role a patch plays within an extension patch structure. However, the root function 462 includes an original root functionality. Note that the given function 462 of FIG. 6 is shown as a DLL but may be any function with a TVector such as a system function, an application function, or a DLL function. Additionally, in other embodiments of the present invention, different types of code may be patched into the patch chain 450. For example, an embodiment of the present invention which allows patching of 68K code is described below with respect to FIG. 14.

In the embodiment of FIG. 6, the functionality which enables the patch chain 450 to properly execute resides mainly in the root patch block 460 and the first time patch code 456. To support this functionality, the root patch block 460 includes an enable flag 461, a trap address support pointer 463, a re-direct code 465, a final patch block pointer 467, a given function code pointer 469, a given function TVector pointer 471, and a next patch pointer 473. The enable flag 461, the given function code pointer 469, the given function TVector pointer 471, and the next patch pointer 473 each respectively play a role analogous to the enable flag 484, the patch_1 code pointer 480, the patch_1 TVector pointer 482, and the next patch pointer 486. Note that the root patch block's enable flag 461 is set to "TRUE" initially, thereby insuring that at least one link in the patch chain is operable from the very start. As the analogous enable flag 484, the patch_1 code pointer 480, the patch_1 TVector pointer 482, and the pointer 486 are described above with reference to patch_1 block 457, no further discussion of these elements is provided.

The elements of the root patch block which are not found in an extension patch block include the trap address support pointer 463, the re-direct code 465 and the final patch pointer 467. The trap address support pointer 463 is for use in emulating patch strategies which utilize exception type patching (such as the ATRAP instruction previously discussed) and will be described in further detail below with respect to FIG. 14. The re-direct code 465 serves to redirect function calls on to the first time patch code 456, thereby insuring an orderly execution of the patch chain 450. For example, a call may originate from a call to the given function 462 or a call made to other extension patches which are members of the patch chain 450. The final patch block pointer 467 points to the final patch block in the patch chain 450, which in this case is patch_2 block 510. In the embodiment of FIG. 6, the patch chain 450 begins executing with the final patch block 510 and the final patch block pointer 467 is used by the first time patch code 456 to accomplish this execution order.

The first time patch code 456 is the initial piece of code which is executed whenever a given function which is patched is called. In general terms, the role of the first time patch code 456 is as follows. A call made to a given function 462 will be directed to the address to which the given function's code pointer 402 points. Since the given function 456 has been patched, the given function code pointer 402 points to a re-direct code 465 in the root patch block 460. The redirect code will in turn jump execution control to the first time patch code 456. The first time patch code 456 is responsible for starting the execution of the patch chain correctly.

Initially, the first time patch code 456 will find the final patch block at the end of the patch chain 450 and determine if the final patch block is enabled. In explanation, the final patch block is located at an end of the patch chain 450 opposite the root patch block 460. If the patch block at the end of the patch chain is disabled, the first time patch code 456 will continue on through the patch chain 450 until an enabled patch block is found. When an enabled patch block is found, the first time patch code 456 performs the necessary record keeping and jumps to the appropriate patch code. One method of execution for the first time patch code is described in more detail below with reference to FIG. 12.

With reference to FIG. 7, a modern patching paradigm in accordance with one embodiment of the present invention will be described. The modern patching paradigm includes a dynamically linked library (DLL) application 550 and a patch chain 450 as described above with respect to FIG. 6. The DLL application 550 includes application code 552 and application data 554. In turn, application code 552 will have a call 556 to service glue 558. As discussed in the background, service glue such as service glue 558 provides an indirection across dynamically linked library boundaries. The main function of the service glue is to save memory resources. That is, if the system routine where called more than once, the service glue 558 plus the multiple calls require less memory than duplicating service glue 558 in multiple locations.

The service glue 558 responds to the call 556 and redirects the call using a pointer 560 found in the application data 554 which points to the transition vector (TVector) 400 of the given function 462. In turn, the TVector 400 has been modified to point to the remaining portion 562 of patch chain 450. Specifically, as shown in FIG. 6, the code pointer 402 points to the re-direct code 465 found in the root patch block 460.

Figure 8:
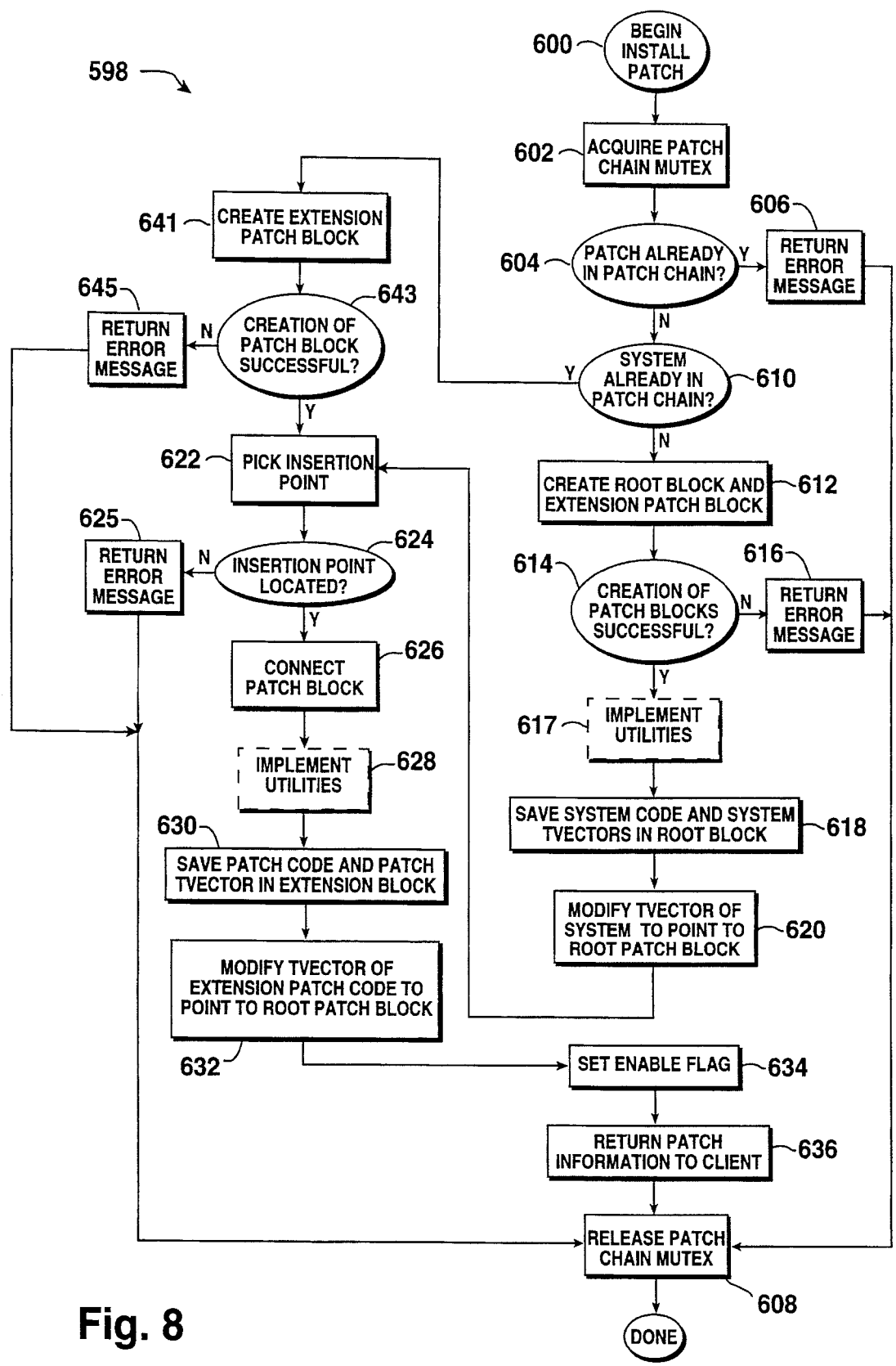
FIG. 8 is a flow chart illustrating one method for installing an extension patch into a patch chain in accordance with one aspect of the present invention.

Turning next to FIG. 8, a computer implemented method 598 for integrating patches into a computer operating system in accordance with one aspect of the present invention will be described. According to some embodiments, a patch manager is responsible for implementing the integration method 598.

In a first step 600 the method 598 begins to install an extension patch into a given function. In explanation, the method 598 applies to a variety of situations in which a patch may be installed. Some suitable examples include the system installing a patch during system boot, an application installing a local patch during application launch, and a separate service installing a local patch into an application's process closure. In explanation, patches are normally local patches and thus only effect the application in which the new patch is installed. Thus step 600 could be in response to any suitable request to install a new patch.

In a next substantive step 602, the patch manager acquires a mutual exclusion lock (mutex) associated with the appropriate patch chain 450. As will be familiar to those skilled in the art of multi-process and/or multi-threaded computing environments, a "mutex" is a synchronization variable which enables multiple computer entities executing within a single operating system to properly synchronize their operation. The patch chain mutex effectively prevents other computer entities from modifying the patch chain 450 while the patch manager owns the patch chain mutex. As will be appreciated, other types of synchronization variables as well as other lock mechanisms may be suitable for use in locking the patch chain 450.

Once the patch chain mutex has been acquired, a step 604 determines if the extension patch is in any patch chain for this given function. In the embodiment of FIG. 8, if the extension patch is in any patch chain for this given application, it is determined that an error has occurred. Thus, in a step 606, the patch manager returns an error message to the client which requested that the extension patch be installed. Suitable error messages include messages as simple as "FAILURE" or more elaborate messages providing details regarding the nature of the failure. After issuing the error message, the patch manager releases the patch chain mutex in a step 608. Thus step 608 makes the patch chain available to other computer entities.

If the new patch 454 is not already in any patch chain such as patch chain 450, control is given to a step 610 where the patch manager determines if the given function 462 is already in a patch chain. This may be determined by retrieving and then evaluating the TVector of the given function 462. As should be apparent, the TVector of every routine which is found in a patch chain 450 will point to a re-direct code 465. In contrast, the TVector of a routine which is not in a patch chain 450 will not point to a re-direct code 465. Note that the function which the patch 457 is intended to patch need not correspond to the root patch structure 452; the given function which the extension patch 457 is intended to patch may be any function present in the patch chain 450.

However, as described with respect to FIG. 6, the given function 462 is included in the root patch structure 452. Thus if the given function 462 is not in the patch chain, no patch chain 450 currently exists for the given function 462. If there is no patch chain 450 for the given function, in a step 612, a root patch block 460 and an extension patch block 457 are created. Creating the root patch block 460 and the extension patch 457 block includes steps such as allocating memory and setting up the appropriate data structures. Also, as part of creation step 612, the enable flag 484 in the new extension patch block 457 is set to "FALSE" and the enable flag 461 in the root patch block 460 is set to "TRUE."

In a next step 614, the creation of the root patch block 460 and the extension patch block 457 is verified. Creation may fail for a variety of reasons such as the computer system not having enough memory to install the patches. If creation fails, in a step 616 the patch manager returns an appropriate error message to the requesting client and releases the patch chain mutex in step 608.

If it is determined that the creation of the root patch block 460 and the extension patch block 457 was successful, then in a step 617 the patch manager implements any desired utilities. The utilities can be any variety of services which the operating system may optionally implement at this point. For example, a patch record keeping and observation system may be installed to monitor what types of patches applications are installing onto the system. Additionally, error checking (i.e. debugging) tools might be implemented to aid in finding problems.

Subsequently, in a step 618, appropriate addresses are stored in the given function code pointer 469 and the given function TVector pointer 471. As described with reference to FIG. 6, after step 618, the given function code pointer 469 will point to the start of function code and the given function TVector pointer 471 will point to the given function TVector 400. Note that the value for the given function code pointer 469 can be found in the initial, unpatched value of the given function TVector code pointer 402. Thus, after step 618, the address of the given function code is saved. Then in a step 620, the patch manager modifies the given function TVector 400 to point to the re-direct code 465. This is done by storing a pointer to re-direct code 465 into the code pointer 402 portion of the given function TVector 400.

After the root patch block parameters have been properly initialized in steps 618 and 620, an insertion point for the new extension patch 454 is selected in a step 622. A variety of strategies and insertion point selection criteria are discussed immediately following the discussion of FIG. 8. In brief, the patch chain 450 of the present invention provides the capability of choosing an insertion point for a new extension patch 454. Regardless of the selection strategy, in a next step 624, it is determined if an insertion point for the new extension patch 454 was found. If an insertion point is not found, then in a step 625 an appropriate error message is returned to the requesting client and any memory which was allocated for the new extension patch is accordingly de-allocated. Then the patch chain mutex is released in a step 608.

When an insertion point is successfully found, the method 598 continues in a step 626 by connecting the extension patch block 457 into the patch chain 450. Connection step 626 includes the substeps of modifying the appropriate next patch pointers so that all the patches in the patch chain 450 are properly interconnected with the new extension patch structure 454 properly linked. Additionally, if the final patch block changes, the final patch block pointer 467 must be changed accordingly.

It is also important to note that the interconnection of step 626 must be done in a orderly and safe manner. If the new extension patch block 457 is the final patch block, then the previous patch pointer 488 in new extension patch block 457 must be set before the final patch block pointer 467 is set. If the new extension patch block 457 is not the final patch block, then the previous pointer 488 in new extension patch block 457 must be set prior to setting the previous pointer in the adjacent patch block further from the root patch block 460. After the patch chain 450 is modified so that the new extension patch structure is properly connected, any utility functions are implemented in a step 628. Step 628 is analogous to step 616; therefore, no further description is provided.

After the utilities have been implemented, in a step 630 appropriate addresses are stored in the extension patch code pointer 480 and the extension patch TVector pointer 482. As described with reference to FIG. 6, after step 630, the extension patch code pointer 480 will point to the extension patch code 459 and the extension patch TVector pointer will point to the extension TVector 400. Note that the value for the extension patch code pointer 480 is identical to the original, unpatched value of the extension TVector code pointer 402. Subsequent to step 630, in a step 632, the patch manager modifies the extension patch TVector 400 to point to the re-direct code 465. This is done by storing a pointer to re-direct code 465 into the code pointer 402 portion of the extension patch TVector 400.

After step 632 has successfully completed, the patch chain is properly linked with the new extension patch structure 454 properly integrated into the patch chain 450. However, since the enable flag 484 was set to "FALSE" in creation step 612, the added functionality of new extension patch structure 450 will not execute. Therefore, in a step 634, the enable flag 484 is set to "TRUE." Note that setting the enable flag 484 to "FALSE" in creation step 612 insured proper execution of the patch chain 450 during the installation of the new extension patch structure 450. For example, an error would have occurred if the enable flag 484 was "TRUE" prior completing the initialization steps 630 and 632. This error would have resulted from unpredictable values present in any of the pointers such as extension patch code pointer 480 or extension patch TVector pointer 482.

Once the enable flag 484 is set, a step 636 returns patch chain information to the client which requested that the new extension patch 459 be added to the patch chain 450. Then, in a final step 608, the patch chain mutex is released.

In the preceding discussion of FIG. 8, the NO branch of step 610 was described in detail. Now, in further explanation, the YES branch of step 610 will be described. If, in step 610, it is determined that a patch chain 450 already exists, then control is passed to a create extension patch block step 641. Step 64 1 includes the substeps of allocating memory and setting the enable flag 484 to "FALSE." Then in a step 643, it is determined whether the extension patch block 457 was successfully created. If not, then in a step 645 an appropriate error message is returned to the client which requested insertion of the new extension patch 459 and in step 608 the patch chain mutex is released. If the extension patch block was successfully created in step 641, then control is passed to step 622 where an insertion point is selected. For a detailed description of step 622 and subsequent steps, please see the preceding paragraphs.

In reference to the insertion point selection step 622 of FIG. 8, a variety of selection strategies will now be described. In what may be termed by analogy as "blind" insertion strategies, the patch manager may insert the new extension patch at a consistent location in the patch chain. Suitable examples of the blind insertion strategies include appending the new extension patch structure after the final patch structure and inserting the new extension patch adjacent to the root patch structure.

In perhaps a more sophisticated embodiment of selection step 622, the new extension patch structure may include some insertion criteria which must be met for finding an insertion point. For example, a new extension patch structure may insist on being the final patch structure. Thus if an extension patch structure which also insisted on being the final patch structure is already present in the patch chain, then an insertion point for the new extension patch structure will not be found. In another example, a new extension patch structure may insist on preceding and being adjacent to a specific patch structure. In this case if the specific patch structure is not present in the patch chain, or if another patch structure having the same requirements is already present in the patch chain, then an insertion point for the new extension patch structure will not be found.

With reference to FIGS. 9–13, one flow of execution of a patch chain 450 will be described. By way of explanation, each of FIGS. 9–13 describe operations which occur within the different portions of the modern patching paradigm. As will be appreciated, each of FIGS. 9–13 are described from the varying perspectives. While FIGS. 9 and 10 provide insight into the present invention, FIGS. 9 and 10 also provide a description of calls across DLL boundaries made to non-patched function. The separation into four Figures was done for the sake of clarity. However, FIGS. 9–13 may be woven together in an apparent manner to provide an overall picture and the separation should in no way be construed as limiting.

Turning first to FIG. 9, a method 700 for a client application to invoke a patch chain 450 in accordance with one embodiment of the present invention will be described. In a first step 702, the client application makes a call to the desired function through its service glue. This step is analogous to the element call to service glue 556 of FIG. 5. From the perspective of the client application, the next step occurs in a step 704 where the client receives the results, if any, of the call made in step 702. Thus the service performed by the patch chain is, in a way, transparent to the client. However, the client's global pointer has been changed as a result of the call. Accordingly, in a step 706, the original value of the client's global pointer is retrieved from a stack stored in memory. Those skilled in the art of programming with transition vectors will be well familiar with design and implementation of instructions such as step 706. Once the client has restored its global pointer, the method 700 is done.

Turning next to FIG. 10, a method 710 for a client's service glue to pass a call for a given function routine to the new code address is described. In an initial step 712, the service glue receives the call from the client application. This call will include any necessary arguments and will be prepared (if necessary) according to the requirements of the given function routine. As described previously in the detailed description, the given function may be a system function, an application function, a service, a utility function, etc.

In a next step 714, the service glue saves the client's global pointer into a stack stored in memory. In a next step 716, the service glue loads the new global pointer into a register in memory. As will be apparent from FIG. 6, the new global pointer is the given function global pointer present in the given function TVector. It is noted that the discussion herein regarding global pointer manipulation (such as the discussion with respect to step 716) is provided to present a more complete discussion. However, those skilled in the art will realize that steps involving global pointer manipulations are not directly related to the present invention. Then in a step 718, the service glue loads a new code pointer into a register. Again, with reference to FIG. 6, it will be apparent that the new code pointer points to the root patch block's re-direct code. In a final step 720 of method 710, the service glue jumps to the new code location using the new code pointer.

With respect to FIG. 11, a method for a root patch block to receive a call and respond by calling first time patch code in accordance with one aspect of the present invention will be described. In a step 732, the root patch block receives a call to perform the given function. Next, in a step 734, the return address to the actual client is saved in a scratch register in the case where the microprocessor places the return address in a register (as on the PowerPC paradigm of FIG. 4) instead of on a stack (as on the 68K paradigm of FIG. 2). The client's return address must be preserved to pass on to the patch function. Then, in a step 736, the root block performs a function call to a first time patch code. Because this is a call instead of a jump, the return address on entry to the first time code points to the root block.

Figure 12:
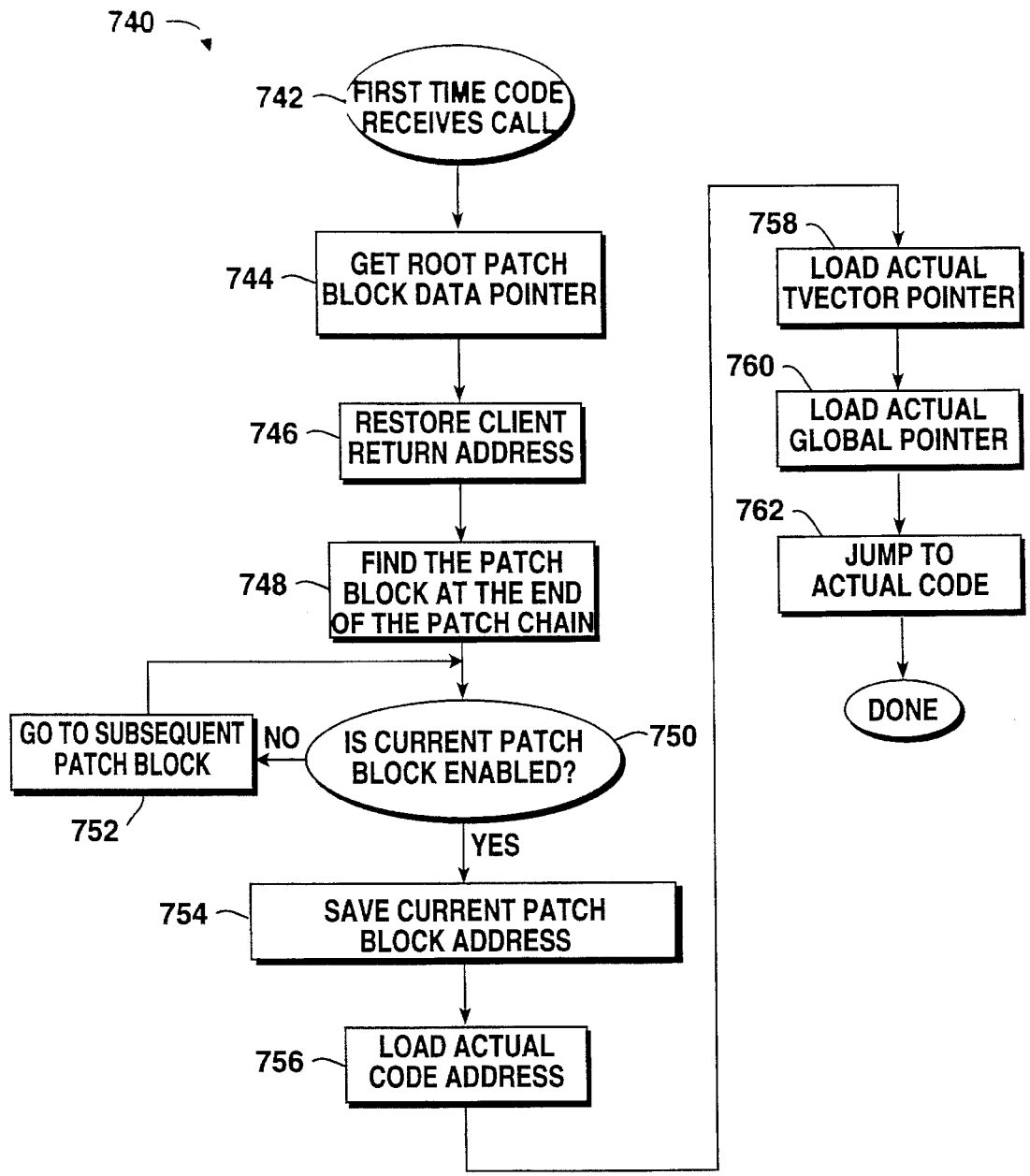
FIG. 12 is a flow chart illustrating a method for first time code to initiate the execution of a patch chain in accordance with one aspect of the present invention.

Turning next to FIG. 12, a method 740 for first time patch code to initiate the execution of a patch chain in accordance with one embodiment of the present invention will be described. The method 740 initiates in a step 742 where the first time patch code receives a call to begin executing the patch chain. In response, in a step 744, the first time patch code retrieves the root patch block data pointer. The call to the first time patch of step 736 left a return address pointing back into the root patch block. Since the offset of the call instruction in the root patch block is constant, subtracting this constant from the return address yields the beginning of the root patch block. Following step 744, in a step 746, the client return address is restored.

Then, in a step 748, the final patch block pointer 467 is used to find the patch block located at the end of the patch chain 450. In the embodiment of method 740, the flow of execution begins with the final patch and processes through to the root patch. However, as will be apparent to those skilled in the art, any consistent order for the flow of process execution through the patch chain is suitable. In any event, in a next step 750 the first time code determines if the patch block currently being evaluated is enabled. For example, the patch block may be in the process of installation or may have been disabled.

If the current patch block is disabled, in a step 752 the subsequent patch block is selected and once again evaluated in step 750. The evaluation step 750 and the selection step 752 will cycle until an enabled patch block is found. As discussed with respect to step 612, the embodiment of FIG. 8 guaranteed that an enabled patch block will be found by setting the enable flag 461 of the root patch block 460 to "TRUE." However, in other embodiments of the present invention, an error message could be returned or other appropriate action taken if no enabled patch blocks were found.

Nevertheless, after an enabled patch block is found, in a step 754 the current (i.e. selected in step 750) patch block address, hereinafter referred to as current address, is stored in a dedicated slot in the stack. This will be used later in step 804 of FIG. 13. In steps 756–760, the pointers necessary for executing the patch code are loaded into registers so they can be directly accessed and utilized. So, in a step 756, the actual address of the patch code (or given function code if the current patch block is the root block) is loaded into a first register. Note that the actual address of the code is the patch code pointer 480 for the current patch. Next in step 758, the actual TVector pointer is loaded into a second register; this is the TVector pointer 482 for the current patch. Then in a step 760, the actual global pointer is loaded into a third register. Similarly, note that the actual global pointer corresponds to the global pointer 404 resident in the current patch TVector 400. After the preparation steps 756–760 are completed, the first time code jumps to the actual patch code to begin execution.

When a patch function such as patch_1 459 receives a call it can perform any desired pre-processing and then perform one of two operations: (1) return to its caller, either the original client or the previous patch, or (2) call through to a subsequent patch. In case (2), when execution returns back to patch_459 it may in turn perform any desired post-processing. As will be appreciated by those skilled in the art, implementing case (1) involves utilization of addresses which are readily available and follows directly from the previous discussion. However, case (2) requires more explanation. Therefore implementing case (2) will be described in more detail below with respect to FIG. 13.

Figure 13:
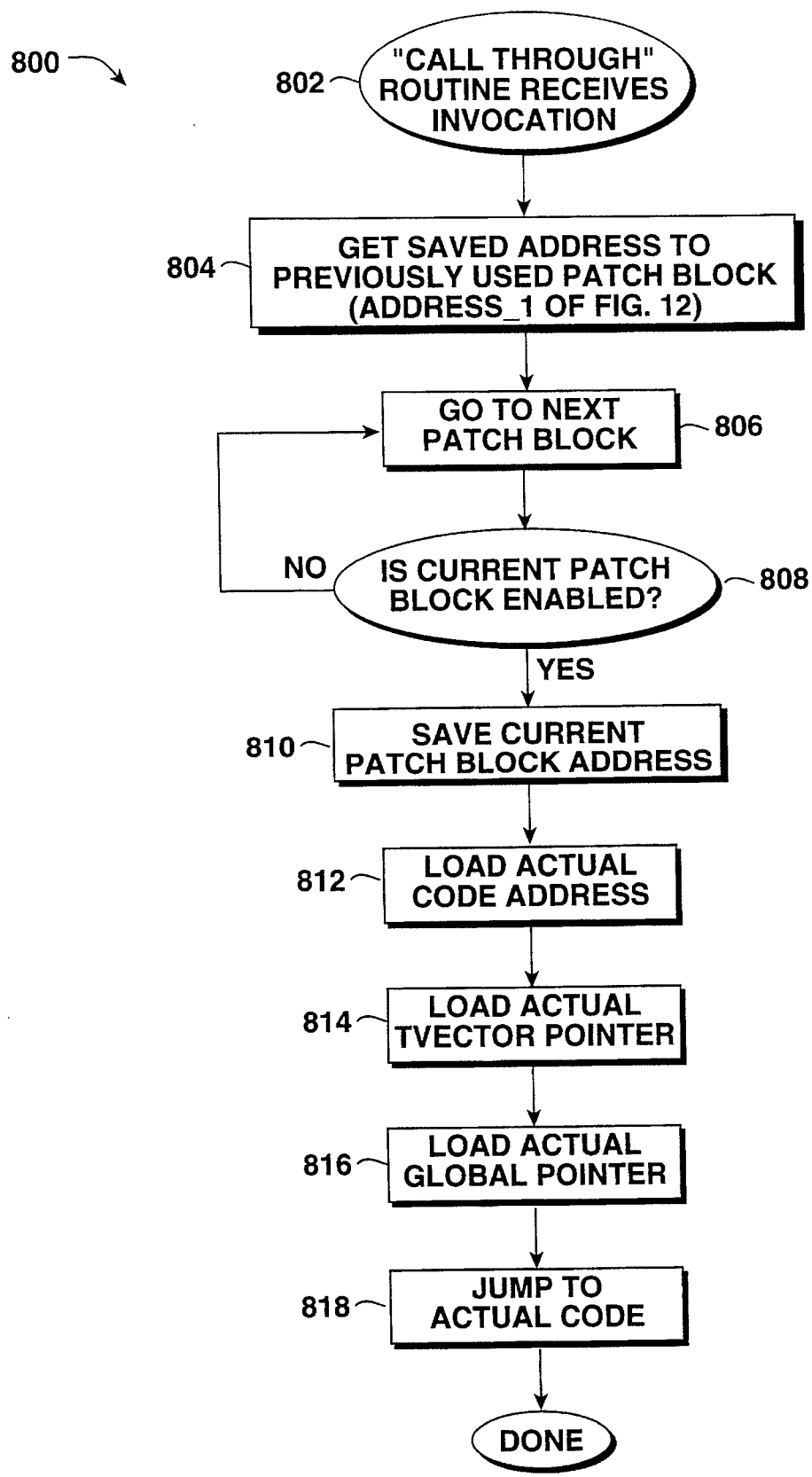
FIG. 13 is a flow chart illustrating a method for a patch structure in a patch chain to pass a call along to a subsequent patch structure, the patch structure utilizing a "call through" routine in accordance with one embodiment of the present invention.

Turning to FIG. 13, one method 800 for implementing a call through routine in accordance with one embodiment of the present invention will now be described. As discussed previously, a call through routine enables an extension patch structure to pass along a call to a subsequent patch structure, which may be an extension patch structure or a root patch structure. Also, the address of the call through routine is part of the information returned to a client in step 636 of FIG. 8.

In a first step 802, the "call through" routine is invoked by a patch function. After receiving the invocation in step 802, in a step 804 the call through routine retrieves current address (please see step 754 of FIG. 12), current address pointing to the patch structure which invoked the call through routine.

Then, in a step 806, the call through routine will select the patch block which follows the calling patch block. In step 808, it is determined if the selected patch block is enabled. If the current patch block is not enabled, control returns to step 806 where the subsequent patch block is selected. In this manner the select subsequent patch step 806 and the evaluate subsequent patch step 808 will cycle in a loop until the current patch is an enabled patch. As will be appreciated, the cycle of :step 806–step 808 is guaranteed to stop due to the enable flag of the root patch block always being set during creation.

Once the current patch is an enabled patch, in a step 810 the current patch block address is saved in the stack. In the subsequent steps 812–816, the pointers necessary for executing the current patch code are loaded into registers so as to directly access and utilize the pointers. (Note that this is analogous to steps 756–760 of FIG. 12.) So, in a step 812, the actual address of the current patch code (or given function code if the current patch block is the root block) is loaded into a first register. Note that the actual address of the code is the patch code pointer 480 for the current patch. Next in step 814, the actual TVector pointer is loaded into a second register; this is the TVector pointer 482 for the current patch. Then in a step 816, the actual global pointer is loaded into a third register. Similarly, note that the actual global pointer corresponds to the global pointer 404 resident in the current patch TVector 400. After the preparation steps 812–816 are completed, the call through routine jumps to the actual patch code in a step 818 to begin execution.

Figure 14:
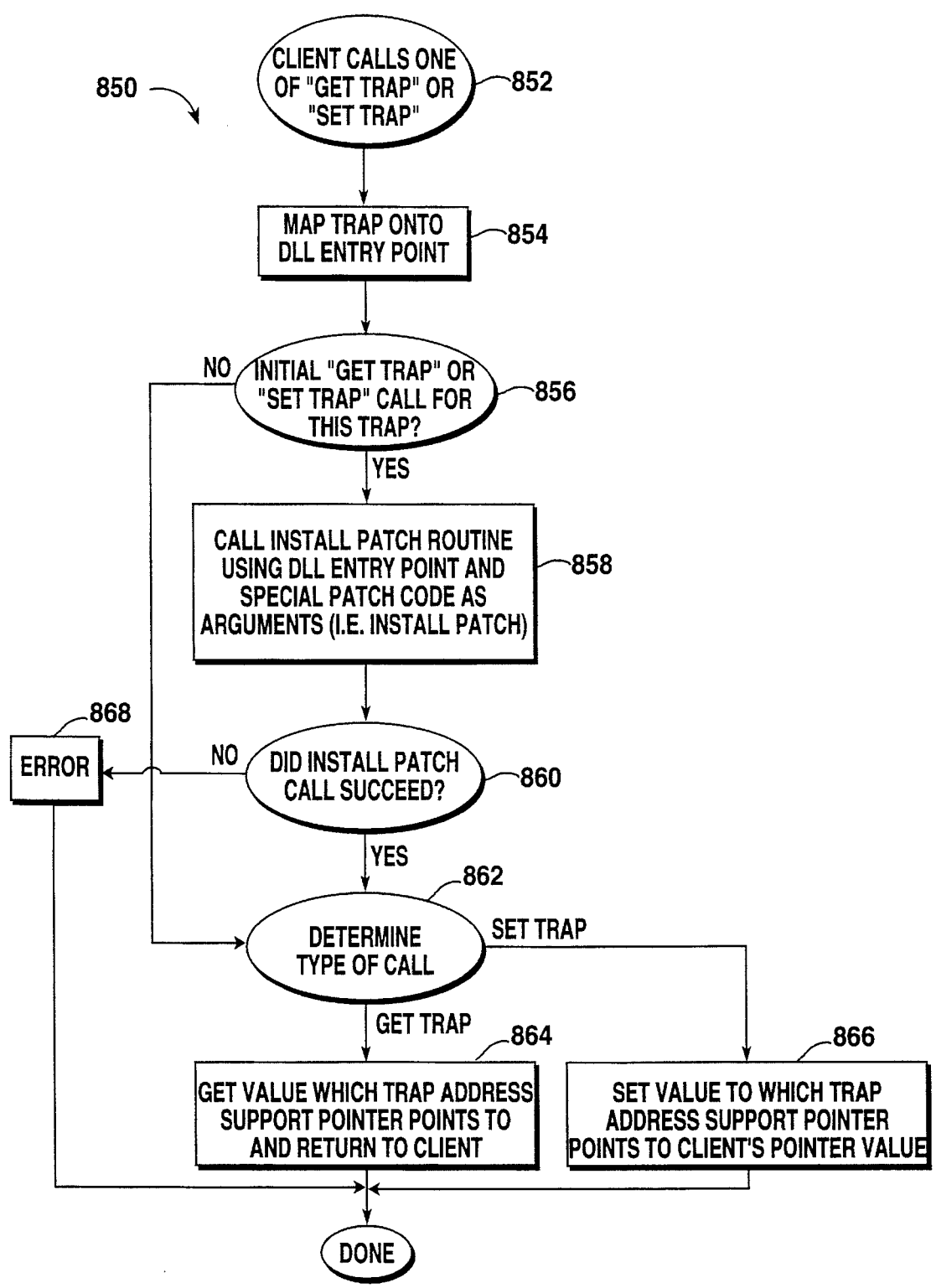
FIG. 14 is a flow chart illustrating one method for utilizing the methods and apparatus of the present invention to emulate the patching mechanisms of the prior art in accordance with one aspect of the present invention, thereby enabling operating code written for the prior art operating systems to be executed using the modem patching paradigm of the present invention.

Turning next to FIG. 14, one method 850 for utilizing the methods and apparatus of the present invention to emulate patching mechanisms utilizing ATRAPs and trap tables (as described in the Background) in accordance with one aspect of the present invention will be described. The method 850 enables operating code written for the prior art operating systems to be executed using the modern patching paradigm of the present invention.

Figure 2:
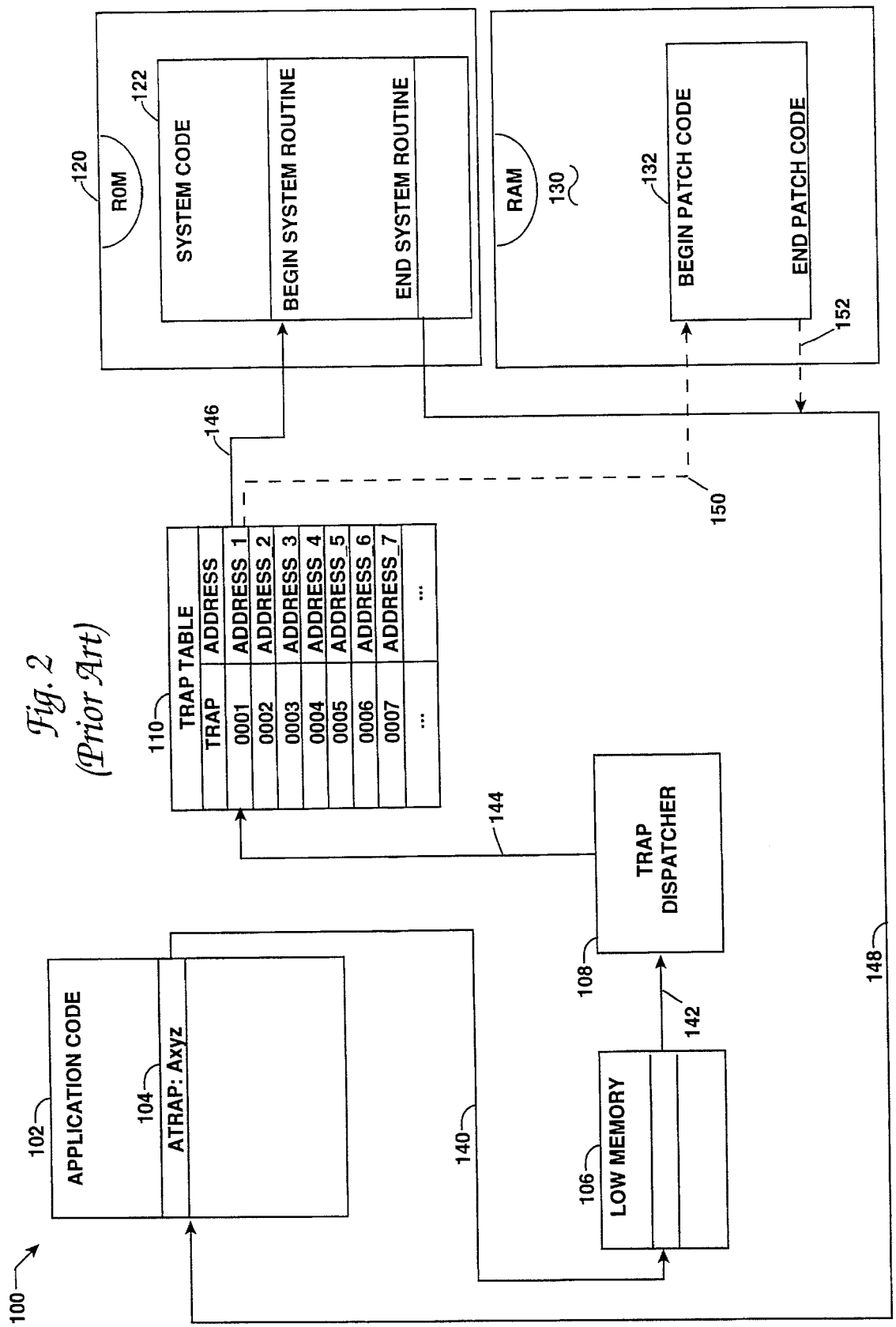
FIG. 2 is a diagrammatic illustration of a 68K patching paradigm of the prior art.
Figure 3:
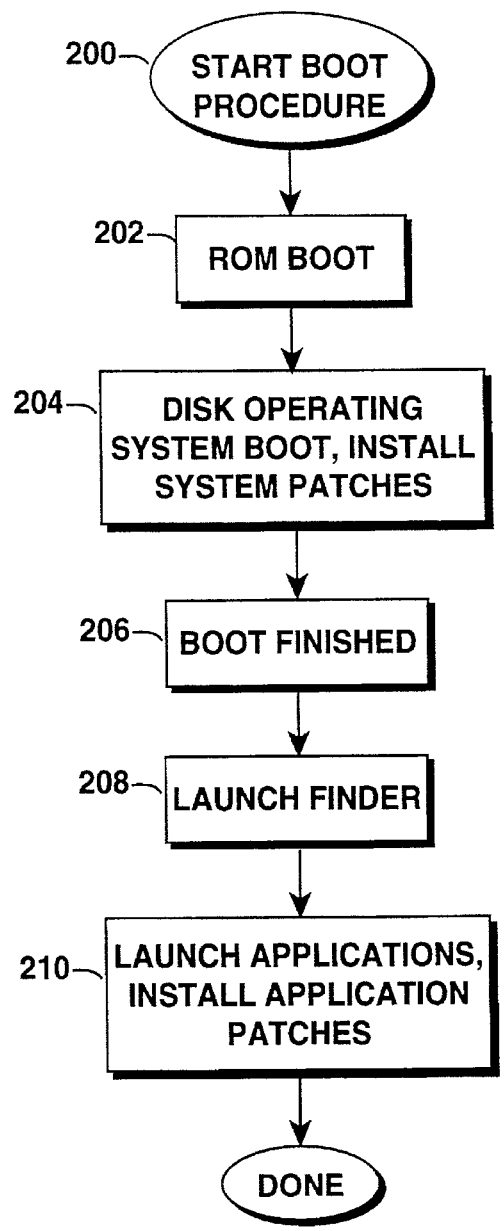
FIG. 3 is a flow chart showing a method for installing patches in accordance with the prior art.
Figure 4:
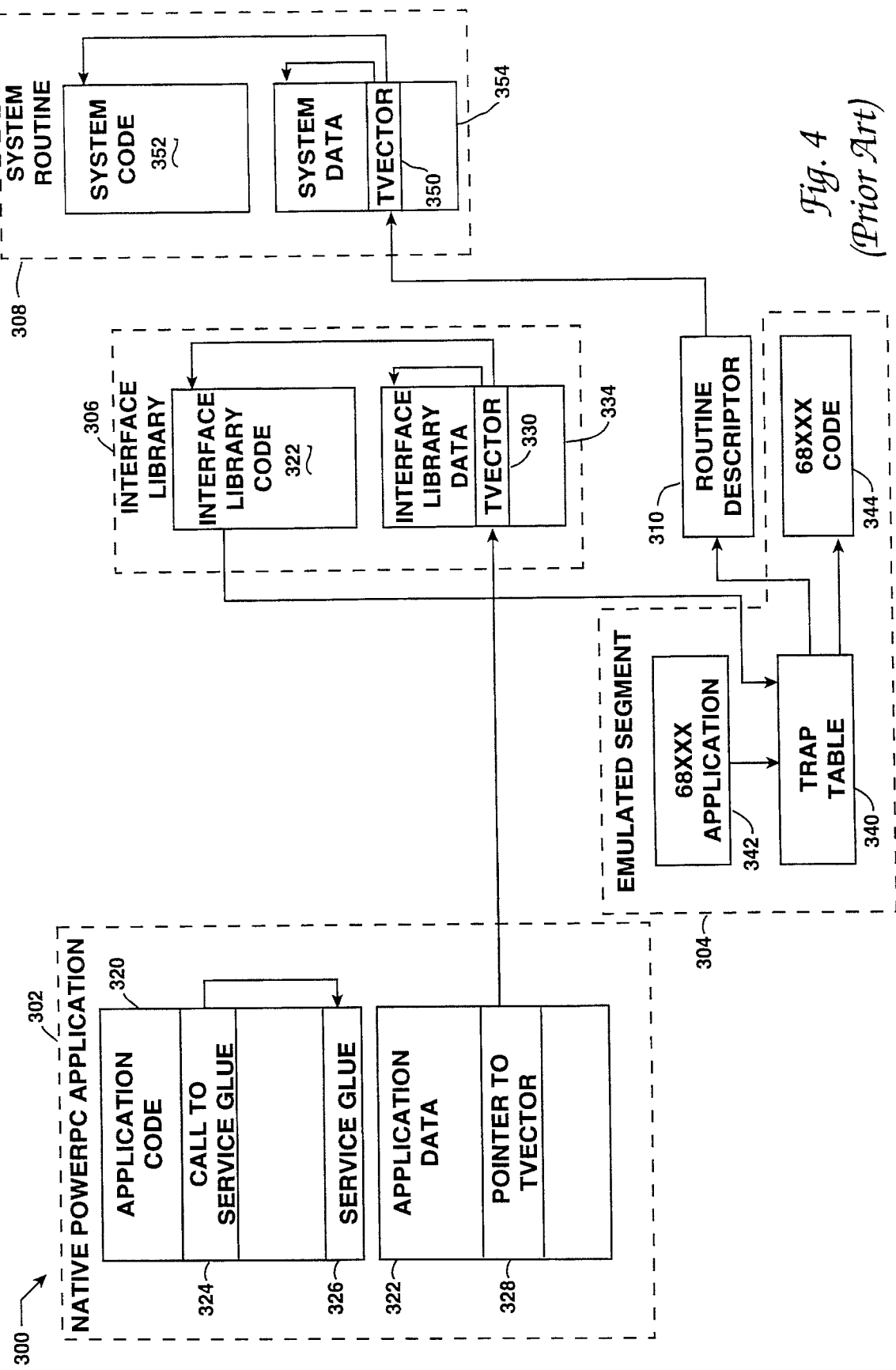
FIG. 4 is a diagrammatic illustration of a PowerPC patching paradigm of the prior art.

As will be appreciated by those skilled in the art, in the prior art patching paradigms of FIGS. 2 and 4, application code had to manually patch into a given function by modifying the trap table. In addition, if a prior art patch code wished to pass a call along to subsequent patches, it also had to do this manually. These operation were performed through a set of commands which can be separated into two types: "GET TRAP" commands and "SET TRAP" commands.

In general, a GET TRAP command has as an argument a specific ATRAP instruction. In response to the GET TRAP command, the operating system would return the appropriate ATRAP address to the requesting client. As will be appreciated, the appropriate ATRAP address is that address listed as the trap table entry corresponding to the specific ATRAP instruction. A SET TRAP command had two arguments: a specific ATRAP instruction and a new address. In response to a SET TRAP command, the operating system would replace the appropriate ATRAP address with the new address.

As an example, if an application wanted to append a patch to a given function, it could perform the following. Initially, the application would perform a GET TRAP command with the desired ATRAP instruction as an argument. In return, the application would receive the original code address (ATRAP address) which it would store in the extension patch code for later use. Then, the application would invoke a SET TRAP command having the desired ATRAP instruction as one argument and the address of the desired extension patch as another argument. The SET TRAP command would modify the appropriate ATRAP address in the trap table so that all calls to the given function would be redirected to the desired extension patch.

Accordingly, when a call is made to the given function, the trap dispatcher will redirect the call to the extension patch, the extension patch can then perform any desired processing. Furthermore, since the address of the given function code was retrieved in the previous GET TRAP step, the extension patch can pass a call along to the given function.

In order to enable emulation of the GET TRAP and SET TRAP functionality within the present invention some specific structure is included in a patch chain 450. The trap address support pointer 463 is analogous to the ATRAP address in the emulated patching paradigm. Then, in response to an initial one of GET TRAP or SET TRAP being invoked for the patch chain 450, an emulation extension patch structure 454 is installed into the patch chain 450. The emulation extension patch structure 454 will have a typical patch block 457 but its patch code will be a special patch code 476.

In the described embodiments, the special patch code 476 is generic code arranged to implement both the GET TRAP and SET TRAP instructions for any ATRAP instruction, and to further properly bundle (if necessary) and re-direct a call made to the emulation extension patch structure 454 onto the original 68K code.

The special patch code includes two separate routines for responding to a call to the patch chain 450. The atrap address support pointer 463 is initially set to point to the first routine. This first routine is then performed in response to the patch chain executing when the emulation extension patch structure 454 has been integrated into the patch chain 450 but the trap address support pointer 463 has not been modified (only GET TRAP commands have been performed). The first routine simply passes the call through to the next appropriate patch block.

The second routine is performed in response to the patch chain executing after the ATRAP address has been modified. One general flow of execution for the second routine is as follows. Initially, the trap number received as an argument to the GET TRAP or SET TRAP command is used to determine the signature of the requested trap. Then, using the signature of the requested trap, the second routine retrieves information regarding the requested trap. This information is found in a table resident in memory on the computer system. Once this information is retrieved, the second routine can properly bundle a client's call which is in turn is passed through the trap address support pointer 463.

Turning the attention directly to FIG. 14, in an initial step 852, a client calls one of a "GET TRAP" or a "SET TRAP" command, passing a specific ATRAP as an argument. In response, in a step 854, the operating system will map the specific ATRAP instruction onto a corresponding DLL entry point. Then, in a step 856, it is determined if the call received in step 852 is the first "GET TRAP" or "SET TRAP" call for the specific ATRAP instruction. If neither a "GET TRAP" or "SET TRAP" call for the specific ATRAP instruction has been previously performed, then, control is passed to a step 858. In step 858, an "install patch" routine is invoked using the corresponding DLL entry point and a special patch code as arguments, in explanation, the special patch code has a structure which, when inserted into a patch chain 450, enables a patch chain 450 to properly execute the 68K patch code. As will be appreciated, the "install patch" routine may implement the steps of install patch method 598 of FIG. 8.

After the install patch routine has been called, a step 860 determines if the patch was installed successfully. If not, an appropriate error message may be returned to the calling client in a step 868 and method 850 is done. If the patch was successfully installed, a step 862 determines the type of call: "GET TRAP" or "SET TRAP."

On the one hand, following the "GET TRAP" branch of step 862, in a step 864, the value which the trap address support pointer 463 points to is returned to the client. On the other hand, following the "SET TRAP" branch of step 862, in a step 864, the value which the trap address support pointer 463 points to is modified in accordance with the value received as an argument in step 852. In any event, after the appropriate action has been taken in either step 862 or step 864, the method 850 is complete.

While this invention has been described in terms of several preferred embodiments, there are alterations, permutations, and equivalents which fall within the scope of this invention. It should also be noted that there are many ways of implementing both the methods, apparatus, and structures of the present invention.

For example, the described embodiment was directed towards an operating system which has a function calling convention of passing call parameters by way of predefined registers. However, as will be apparent to those skilled in the art of computer programming, the patching methods and apparatus of the present invention may be modified to operate within computing environments following a calling convention which pushes call parameters onto the system stack.

With reference to the root patch block 460 of FIG. 6, it is noted that a variety of embodiments may be implemented according to the specific needs of the operating system. For example, if the specific operating system does not support ATRAP emulation, then the trap address support pointer 463 is extraneous and may be removed from the root patch block 460. As another example, a root patch block 460 may be generated by including the data structure of an extension patch block 457 with the other necessary elements. In this embodiment, the previous patch pointer 488 could be utilized as the final patch block pointer 467 since the root patch block 460 does not have a previous patch.

It is therefore intended that the following appended claims be interpreted as including all such alterations, permutations, and equivalents as fall within the true spirit and scope of the present invention.

We claim:

1. A computer implemented method for integrating patches into a computer operating system comprising the steps of:

providing an operating system capable of supporting a plurality of patch structures in a patch chain, each patch structure including a patch and a patch block, said patch block pointing to said patch, said patch chain including a root patch block pointing to a given function supported by said operating system, wherein each patch structure of said patch chain can process a call for said given function, each of said plurality of patch blocks pointing to either another patch block or to said root patch block;

obtaining a new patch to be associated with a patch chain for said given function;

determining whether a patch chain is already created in said operating system for said given function, said patch chain for said given function not existing unless said given function is already patched, and creating a root patch block pointing to said given function as the start of a new patch chain if a patch chain has not already been created for said given function;

creating a new patch block for said new patch; and inserting data into said new patch block to cause said new patch block to point to said new patch, thereby forming a new patch structure, and to cause said new patch structure to be joined with said patch chain for said given function.

2. A computer implemented method as recited in claim 1 wherein said patch chain for said given function further includes a lock mechanism arranged such that when said lock mechanism is locked by a computer entity, said patch chain may only be modified by said computer entity, said method further comprising the steps of:

prior to said step of determining whether a patch chain is already created for said given function, locking said lock mechanism thereby protecting said patch chain during any subsequent steps; and after any steps requiring access to said patch chain have been completed, unlocking said lock mechanism.

3. A computer implemented method as recited in claim 2 wherein said lock mechanism is a synchronization variable.

4. A computer implemented method as recited in claim 2 wherein said lock mechanism is a mutual exclusion lock.

5. A computer implemented method as recited in claim 1 further comprising the steps of:

determining whether a patch data structure including said new patch is already present in said patch chain for said given function; and aborting said computer implemented method when a patch data structure including said new patch is already present in said patch chain.

6. A computer implemented method as recited in claim 5 wherein a client has requested that said new patch be integrated into said patch chain, the computer implemented method further including the step of returning an error message to said client when a patch data structure including said new patch is already present in said patch chain.

7. A computer implemented method as recited in claim 1 further comprising the steps of:

determining whether said new patch block for said new patch was successfully created; and aborting the computer implemented method when the creation of said new patch block was not successful.

8. A computer implemented method as recited in claim 7 wherein a client has requested that said new patch be integrated into said patch chain, the computer implemented method further including the step of returning an error message to said client when said new patch block was not successfully created.

9. A computer implemented method as recited in claim 1 wherein said given function includes function code and function data, said function data having a function transition vector, said function transition vector having a function code pointer, and wherein said step of creating said root patch block includes the substeps of:

saving said function code pointer within said root patch block; and saving a pointer to said function transition vector within said root patch block.

10. A computer implemented method as recited in claim 9 wherein said step of creating said root patch block further includes the substep of modifying said function code pointer to point to a redirect code found in said root patch block, said re-direct code arranged to point to a first time patch code such that when a call is made to said given function, the call is redirected to said first time patch code.

11. A computer implemented method as recited in claim 1 further comprising the steps of:

determining whether said root patch block was successfully created; and aborting said computer implemented method when the creation of said root patch block was unsuccessful.

12. A computer implemented method as recited in claim 11 wherein a client requested that said new patch be integrated into said patch chain for said given function, the method further including the step of returning an appropriate error message when the creation of said root patch block was unsuccessful.

13. A computer implemented method as recited in claim 1 wherein said step of inserting data includes the substeps of:

selecting an insertion point for said new patch structure within said patch chain for said given function;

determining whether said insertion point was successfully located; and aborting the computer implemented method if said insertion point is not successfully located.

14. A computer implemented method as recited in claim 13 wherein a client requested that said new patch be integrated into said patch chain for said given function and wherein the computer implemented method further includes the step of returning an appropriate error message to said client when said insertion pointer is not successfully located.

15. A computer implemented method as recited in claim 13 wherein said insertion point was successfully located and said inserted data corresponds to said insertion point.

16. A computer implemented method as recited in claim 1 wherein said step of inserting data includes the substep of joining said new patch structure with said patch chain for said given function by saving a pointer to an adjacent, preceding patch block within said new patch block and saving a pointer to an adjacent, subsequent patch block within said new patch block.

17. A computer implemented method as recited in claim 1 wherein said new patch includes patch code and patch data, said patch data having a patch transition vector, said patch transition vector having a patch code pointer, and wherein said step of inserting data includes the substeps of:

saving said patch code pointer within said new patch block; and saving a pointer to said patch transition vector within said new patch block.

18. A computer implemented method as recited in claim 17 wherein said step of inserting data further includes the substep of modifying said patch code pointer to point to a re-direct code found in said root patch block, said re-direct code arranged to point to a first time patch code, wherein when a call is made to said given function or to any patch in said patch chain for said given function, the call is redirected to said first time patch code.

19. A computer implemented method as recited in claim 1 wherein said new patch block further includes an enable bit and wherein the computer implemented method further includes the step of setting said enable bit to indicate that said new patch is enabled.

20. A computer implemented method as recited in claim 19 wherein a client requested that said new patch be integrated in said patch chain for said given function and wherein said computer implemented method further i includes the step of returning information regarding said patch chain to said client.

21. A computer implemented method as recited in claim 1 wherein said new patch structure is appended at the end of said patch chain.

22. A computer implemented method as recited in claim 2 wherein said new patch structure is inserted between two previously existing patch structures.

23. A computer implemented method as recited in claim 22 wherein one of said two previously existing patch structures is said root patch structure.

24. A computer implemented method for integrating patches into a computer operating system comprising the steps of:

providing an operating system capable of supporting a plurality of patch structures in a patch chain, each patch structure including a patch and a patch block, said patch block pointing to said patch, said patch chain including a root patch block pointing to a root function supported by said operating system, wherein each patch structure of said patch chain can process a call for said root function, each of said plurality of patch blocks pointing to either another patch block or to said root patch block;

obtaining a new patch intended to modify the functionality of a given function, said given function operative to be either a root function or a patch;

determining whether a patch chain including said given function is already created in said operating system, said patch chain including given function not existing unless said given function is already patched, and creating a root patch block pointing to said given function as the start of a new patch chain if a patch chain including said given function has not already been created;

creating a new patch block for said new patch; and inserting data into said new patch block to cause said new patch block to point to said new patch, thereby forming a new patch structure, and to cause said new patch structure to be joined with said patch chain for said given function.

25. A computer implemented method as recited in claim 24 wherein said patch chain including said given function further includes a lock mechanism arranged such that when said lock mechanism is locked by a computer entity, said patch chain may only be modified by said computer entity, said method further comprising the steps of:

prior to said step of determining whether a patch chain is already created including said given function, locking said lock mechanism thereby protecting said patch chain during any subsequent steps; and after any steps requiring access to said patch chain have been completed, unlocking said lock mechanism.

26. A computer implemented method as recited in claim 2 wherein said lock mechanism is a synchronization variable.

27. A computer implemented method as recited in claim 25 wherein said lock mechanism is a mutual exclusion lock.

28. A computer implemented method as recited in claim 24 further comprising the steps of:

determining whether a patch data structure including said new patch is already present in said patch chain including said given function; and aborting said computer implemented method when a patch data structure including said new patch is already present in said patch chain.

29. A computer implemented method as recited in claim 28 wherein a client has requested that said new patch be integrated into said patch chain, the computer implemented method further including the step of returning an error message to said client when a patch data structure including said new patch is already present in said patch chain.

30. A computer implemented method as recited in claim 24 further comprising the steps of:

determining whether said new patch block for said new patch was successfully created; and aborting the computer implemented method when the creation of said new patch block was not successful.

31. A computer implemented method as recited in claim 30 wherein a client has requested that said new patch be integrated into said patch chain, the computer implemented method further including the step of returning an error message to said client when said new patch block was not successfully created.

32. A computer implemented method as recited in claim 24 wherein said given function includes function code and function data, said function data having a function transition vector, said function transition vector having a function code pointer, and wherein said step of creating said root patch block includes the substeps of:

saving said function code pointer within said root patch block; and saving a pointer to said function transition vector within said root patch block.

33. A computer implemented method as recited in claim 32 wherein said step of creating said root patch block further includes the substep of modifying said function code pointer to point to a re-direct code found in said root patch block, said re-direct code arranged to point to a first time patch code such that when a call is made to said given function, the call is redirected to said first time patch code.

34. A computer implemented method as recited in claim 24 further comprising the steps of:
    determining whether said root patch block was successfully created; and
    aborting said computer implemented method when the creation of said root patch block was unsuccessful.

35. A computer implemented method as recited in claim 34 wherein a client requested that said new patch be integrated into said patch chain including said given function, the method further including the step of returning an appropriate error message when the creation of said root patch block was unsuccessful.

36. A computer implemented method as recited in claim 24 wherein said step of inserting dam includes the substeps of:
    selecting an insertion point for said new patch structure within said patch chain including said given function;
    determining whether said insertion point was successfully located; and
    aborting the computer implemented method if said insertion point is not successfully located.

37. A computer implemented method as recited in claim 36 wherein a client requested that said new patch be integrated into said patch chain including said given function and wherein the computer implemented method further includes the step of returning an appropriate error message to said client when said insertion pointer is not successfully located.

38. A computer implement method as recited in claim 36 wherein said insertion point was successfully located and said inserted data corresponds to said insertion point.

39. A computer implemented method as recited in claim 24 wherein said step of inserting data includes the substep of joining said new patch structure with said patch chain including said given function by saving a pointer to an adjacent, preceding patch block within said new patch block and saving a pointer to an adjacent, subsequent patch block within said new patch block.

40. A computer implemented method as recited in claim 24 wherein said new patch includes patch code and patch data, said patch data having a patch transition vector, said patch transition vector having a patch code pointer and a patch global pointer, and wherein said step of inserting data includes the substeps of:
    saving said patch code pointer within said new patch block; and
    saving a pointer to said patch transition vector within said new patch block.

41. A computer implemented method as recited in claim 40 wherein said step of inserting data further includes the substep of modifying said patch code pointer to point to a re-direct code found in said root patch block, said re-direct code arranged to point to a first time patch code, wherein when a call is made to said given function the call is redirected to said first time patch code.

42. A computer implemented method as recited in claim 24 wherein said new patch block further includes an enable bit and wherein the computer implemented method further includes the step of setting said enable bit to indicate that said new patch is enabled.

43. A computer implemented method as recited in claim 42 wherein a client requested that said new patch be integrated in said patch chain for said given function and wherein said computer implemented method further includes the step of returning addressing information regarding said patch chain to said client.

44. A computer implemented method as recited in claim 24 wherein said new patch structure is appended at the end of said patch chain.

45. A computer implemented method as recited in claim 25 wherein said new patch structure is inserted between two previously existing patch structures.

46. A computer implemented method as recited in claim 45 wherein one of said two previously existing patch structures is said root patch structure.

47. An operating system for a computer comprising:
    means receptive to one or more patches for a given function that is capable of running on said computer;
    means for creating a patch chain comprising a root patch block pointing to said given function and at least one patch structure chained with said root patch block, said patch structure including a patch block pointing to an associated patch, said means for creating a patch chain not responsive to create a patch chain unless said given function is to be patched by said at least one patch structure, wherein said patch structure is capable of processing a call for said given function; and
    means for adding new patch structures to said patch chain, whereby a call to said given function is processed by each of said patches in said patch and by said given function.

48. An operating system as described in claim 47 wherein said means for adding a new patch structure includes:
    root determination means for determining if said given function is already present in said patch chain; and
    means to actuate said means for creating a patch chain if said given function is not present in said patch chain.

49. An operating system as described in claim 47 wherein said means for adding a new patch structures includes:
    new patch means for determining if a new patch structure is already present in said patch chain; and
    means responsive to said new patch means to return an error message when said given function is already present in said patch chain.

50. An operating system as described in claim 47 wherein said means for adding new patch structures includes:
    new patch determination means for determining if a new patch structure has been successfully created; and
    means responsive to said new patch determination means to return an error message when said new patch structure is not created successfully.

51. An operating system as described in claim 47 wherein said patch chain further includes a lock mechanism arranged such that when said lock mechanism is locked by a computer entity, said patch chain may only be modified by said computer entity, said operating system further including locking means for locking and unlocking said lock mechanism.

52. An operating system as recited in claim 47 wherein said given function includes function code and function data, said function data having a function transition vector, said function transition vector having a function code pointer, and wherein said means for creating said patch chain include:
    means for saving said function code pointer within said root patch block; and
    means for saving a pointer to said function transition vector within said root patch block.

53. An operating system as recited in claim 52 further including a first time patch code and wherein said root patch block includes a re-direct code arranged to point to said first time patch code such that when a call is made to said given function, the call is redirected to said first time patch code.

54. An operating system as recited in claim 53 wherein said means for creating said patch chain further includes means for modifying said function code pointer to point to said re-direct code.

55. An operating system as recited in claim 47 wherein said means for adding new patch structures includes:

means for selecting an insertion point for said new patch structure within said patch chain;

means for determining whether said insertion point was successfully located; and means for performing an orderly abortion of the operation of said means for adding new patch structures if said insertion point is not successfully located.

56. An operating system as recited in claim 55 wherein the operating system is responsive to a client request that said new patch be integrated into said patch chain for said given function and wherein said means for adding new patch structures further includes means for returning an appropriate error message to said client when said insertion pointer is not successfully located.

57. An operating system as recited in claim 47 wherein said means for adding new patch structures includes means for joining said new patch structure with said patch chain for said given function by saving a pointer to the preceding patch block within said new patch block and saving a pointer to the subsequent patch block within said new patch block.

58. An operating system as recited in claim 47 wherein a new patch includes patch code and patch data, said patch data having a patch transition vector, said patch transition vector having a patch code pointer, and wherein said means for adding new patch structures includes:

means for saving said patch code pointer within said new patch block; and means for saving a pointer to said patch transition vector within said new patch block.

59. An operating system as recited in claim 58 wherein said means for adding new patch structures further includes means for modifying said patch code pointer to point to a re-direct code found in said root patch block, said re-direct code arranged to point to a first time patch code, wherein when a call is made to a new patch structure the call is redirected to said first time patch code.

60. An operating system as recited in claim 47 wherein a new patch block further includes an enable bit and wherein the means for adding new patches includes means for setting said enable bit to indicate that said new patch is enabled.

61. An operating system as recited in claim 47 means for returning information regarding said patch chain to a client.

62. A method for handling a call to a function having at least one patch implemented by way of a patch chain having a plurality of patch structures each having an enable flag, said patch chain not existing unless said function is patched, said method comprising the steps of:

diverting a call from a client for a specified function to a root patch block of said patch chain, wherein said root patch block and said specified function define a root patch structure;

saving a return address of said client;

finding a first patch structure in said patch chain including the substeps of:

(a) selecting a patch structure, said patch structure being one link in said patch chain;

(b) determining if an enable flag corresponding to said selected patch structure indicates that said selected patch structure is enabled; and (c) repeatedly performing steps (a) and (b) until said enable flag corresponding to said selected patch structure indicates that said selected patch structure is enabled, wherein the selection process of step (a) operates a first time by selecting a final patch structure located at an end of said patch chain opposite to said root patch structure and then upon subsequent repetitions of step (a) a subsequent patch structure one link closer to said root patch structure than an adjacent, previous patch structure is selected;

diverting said call to said first patch structure capable of processing said call, said first patch structure selectively returning process control to said client at said return address or passing on said system call to an additional patch structure in said patch chain.

63. A method as recited in claim 62 implemented under a computer operating system having a function calling convention requiring that all call parameters are passed by way of predefined registers, said step of saving a return address of said client including the substep of storing said return address in a predefined register.

64. A method as recited in claim 62 implemented under a computer operating system having a function calling convention requiring that all call parameters are passed by way of adding said call parameters onto a computer operating system memory stack, said step of saving a return address of said client including adding said return address onto a memory stack.

65. A method as recited in claim 62 wherein said first patch structure passes said system call on to an additional patch structure in said patch chain, said step of passing said system call to an additional patch structure including the substeps of:

(a) saving a return address of said first patch structure;

(b) selecting a subsequent patch structure;

(c) determining if an enable flag corresponding to said selected subsequent patch structure indicates that said selected patch structure is enabled; and (d) repeatedly performing: steps (b) and (c) until said enable flag corresponding to said selected subsequent patch structure indicates that said selected patch structure is enabled, wherein the selection process of step (b) operates by selecting a subsequent patch structure one link closer to said root patch structure than an adjacent, previous patch structure.

66. A patch chain operable to modify a functionality of a given function, said patch chain existing only when said given function is patched, said patch chain comprising:

a root patch structure including a root patch block and an associated given function, said root patch block pointing to said associated given function, said associated given function having a root functionality; and a final patch structure being located on an end of said patch chain which is opposite said root patch structure and when said root patch structure and said final patch structure are the only patch structures in said patch chain then said final patch structure is chained to said root patch structure, said final patch structure including a final patch block pointing to a final patch, said final patch having a final patch functionality intended to modify said root functionality;

wherein a call from a client to said given function is diverted to a first time patch code of said operating system by said root patch block, said first time code operable to selectively divert said call to a first enabled patch structure, wherein the first time code selection process begins by evaluating said final patch structure and then continues by evaluating subsequent adjacent patch structures, the first time code selection process complete when an enabled patch structure is found.

67. A patch chain as recited in claim 66 wherein said final patch structure is one of a plurality of patch structures, said plurality of patch structures being chained with said root patch structure to form said patch chain, wherein said call diverted to said first time code may be selectively diverted by said first time code to a desired patch structure in said patch chain.

68. A patch chain as recited in claim 67 wherein said root patch block includes a final patch block pointer pointing to said final patch block and said first time code selectively diverts said call to said final patch structure.

69. A patch chain as recited in claim 66 wherein said root patch block includes a redirect code pointing to said first time code.

70. A patch chain as described in claim 68 wherein said root patch structure and said plurality of patch structures each contain a corresponding enable flag indicative of whether a corresponding patch structure is enabled.

71. A patch chain as described in claim 66 wherein said root patch block includes a trap address support pointer which points to a special patch code, said special patch code responding to a GET TRAP command received from a client by returning the value of the trap address pointer to said client, and said special patch code responding to a SET TRAP command and an address received from a client by modifying said trap address pointer to be said address received from client.

72. A computer system comprising:

a central processing unit;

memory coupled to said central processing unit; and at least one patch chain as recited in claim 66 residing in said memory.

73. A computer system comprising:

a central processing unit;

memory coupled to said central processing unit;

a first time patch code at least partially stored in said memory and implemented on said central processing unit, said first time patch code responsive to a call from a patch chain having a plurality of patch structures to selectively redirect said call to a desired one of said plurality of patch structures;

a patching system having data structures at least partially stored in said memory, said data structures including a root patch structure having a root patch block and an associated function component, said root patch block pointing to said associated function component, said root patch structure being forming one end of a first patch chain, and a final patch structure forming an opposite end of said first patch chain relative to said root patch structure and when said root patch structure and said final patch structure are the only patch structures in said first patch chain then said final patch structure is chained to said root patch structure, said final patch structure including a patch block pointing to a patch, wherein a call from a client process to said function component is diverted to said first time code by said root patch block.

74. A computer system as recited in claim 73 wherein said first time patch code is for use by a plurality of patch chains.

75. A computer system as recited in claim 73 wherein said first time patch code is for use by said first patch chain.

* * * * *

UNITED STATES PATENT AND TRADEMARK OFFICE
CERTIFICATE OF CORRECTION

PATENT NO. : 5,619,698
DATED : April 8, 1997
INVENTOR(S) : Lillich, et al.

It is certified that error appears in the above-identified patent and that said Letters Patent is hereby corrected as shown below:

In the claims:

In Claim 20, at column 23, line 33, delete "further i" and insert --further--.
In Claim 36, at column 25, line 14, delete "dam" and insert --data--.
In Claim 47, at column 26, line 24, delete "patch and by" and insert --patch chain and by--.
In Claim 70, at column 29, line 19, delete "claim 68" and insert --claim 67--.

Signed and Sealed this

Fourteenth Day of September, 1999

Attest:

Q. TODD DICKINSON

*Attesting Officer*  *Acting Commissioner of Patents and Trademarks*